United States Patent
Valtierra et al.

(10) Patent No.: US 11,821,293 B2
(45) Date of Patent: Nov. 21, 2023

(54) OIL RECOVERY TOOL AND SYSTEM

(71) Applicant: Hydroacoustics Inc., Henrietta, NY (US)

(72) Inventors: Robert D. Valtierra, Barrington, RI (US); Mark J. Ozimek, Pittsford, NY (US); Eugene Sisto, Rochester, NY (US); John H. Benton, Littleton, CO (US); Ricardo P. Quintanilla, Irondequoit, NY (US); Kenneth Wittlief, Fairport, NY (US)

(73) Assignee: Hydroacoustics. Inc., Henrietta, NY (US)

( * ) Notice: Subject to any disclaimer, the term of this patent is extended or adjusted under 35 U.S.C. 154(b) by 0 days.

(21) Appl. No.: 17/346,332

(22) Filed: Jun. 14, 2021

(65) Prior Publication Data
US 2021/0372245 A1     Dec. 2, 2021

Related U.S. Application Data

(63) Continuation-in-part of application No. 16/270,020, filed on Feb. 7, 2019, now Pat. No. 11,346,186, which is a continuation-in-part of application No. 16/263,136, filed on Jan. 31, 2019, now Pat. No. 10,704,938.

(60) Provisional application No. 62/659,825, filed on Apr. 19, 2018, provisional application No. 62/627,310, filed on Feb. 7, 2018.

(51) Int. Cl.
*E21B 43/16*     (2006.01)
*E21B 28/00*     (2006.01)

(52) U.S. Cl.
CPC ............. *E21B 43/16* (2013.01); *E21B 28/00* (2013.01); *Y02A 30/14* (2018.01)

(58) Field of Classification Search
CPC ........ E21B 43/16; E21B 43/003; E21B 28/00; E21B 47/00; E21B 34/06; H02K 5/132; H02K 5/1672; H02K 5/20; Y02A 30/14
See application file for complete search history.

(56) References Cited

U.S. PATENT DOCUMENTS

| | | | |
|---|---|---|---|
| 4,509,371 A | 4/1985 | Wellman | |
| 4,523,644 A | 6/1985 | Dismukes | |
| 4,577,691 A | 3/1986 | Huang et al. | |
| 5,672,832 A | 9/1997 | Cucci et al. | |
| 6,755,086 B2 | 6/2004 | Salamitou et al. | |
| 8,113,278 B2 | 2/2012 | DeLaCroix et al. | |
| 11,346,186 B2 * | 5/2022 | Valtierra | H02K 5/132 |

(Continued)

FOREIGN PATENT DOCUMENTS

| | | |
|---|---|---|
| CN | 1406311 A | 3/2003 |
| CN | 105607553 A | 5/2016 |
| EP | 2780858 | 3/2014 |

OTHER PUBLICATIONS

International Search Report With Written Opinion for PCT/US19/17014 dated May 1, 2019.

(Continued)

*Primary Examiner* — Yong-Suk (Philip) Ro
(74) *Attorney, Agent, or Firm* — Duane C. Basch; Dawson Law Firm, PC

(57) ABSTRACT

An apparatus for generating acoustic waves in a medium to stimulate oil recovery within an oil reservoir, the apparatus being operable with a single moving part—a central rotor.

20 Claims, 19 Drawing Sheets

(56) References Cited

U.S. PATENT DOCUMENTS

| | | |
|---|---|---|
| 2004/0149436 A1 | 8/2004 | Sheldon |
| 2004/0182172 A1 | 9/2004 | Richards |
| 2006/0162466 A1 | 7/2006 | Wargo et al. |
| 2009/0065197 A1 | 3/2009 | Eslinger |
| 2009/0200019 A1 | 8/2009 | DeLaCroix et al. |
| 2010/0121257 A1 | 5/2010 | King |
| 2010/0290313 A1 | 11/2010 | Groves |
| 2011/0259120 A1 | 10/2011 | Thonstad |
| 2014/0197704 A1 | 7/2014 | Knapp et al. |
| 2014/0216727 A1 | 8/2014 | Kasyanov et al. |
| 2014/0305877 A1 | 10/2014 | Cioanta et al. |
| 2015/0075867 A1 | 3/2015 | Eddison et al. |
| 2016/0115753 A1 | 4/2016 | Frazier et al. |
| 2016/0146963 A1 | 5/2016 | Hall et al. |

OTHER PUBLICATIONS

International Search Report With Written Opinion for PCT/US19/15960 dated May 23, 2019.

Decision of Rejection, dated Mar. 16, 2023 for Chinese Patent Appl. No. 2019800225896 (application based upon related PCT/US2019/017014).

Sun Ying, "Design and Application of Servo Control System for CNC Machine", published by Southwest Jiaotong University Press, Chengdu, CN. Apr. 2014; p. 51.

Wang Geng etc., "Design, Manufacture and Application of Large Turbo-generator", Shanghai Science and Technology Publishing Press, Shanghai, CN, Nov. 2000; p. 35.

Li Tinghan etc., "Design and Application of Heat Pipe", Chemical Industry Press, Beijing, CN, Aug. 1987, pp. 275-276 & Fig.6-36.

\* cited by examiner

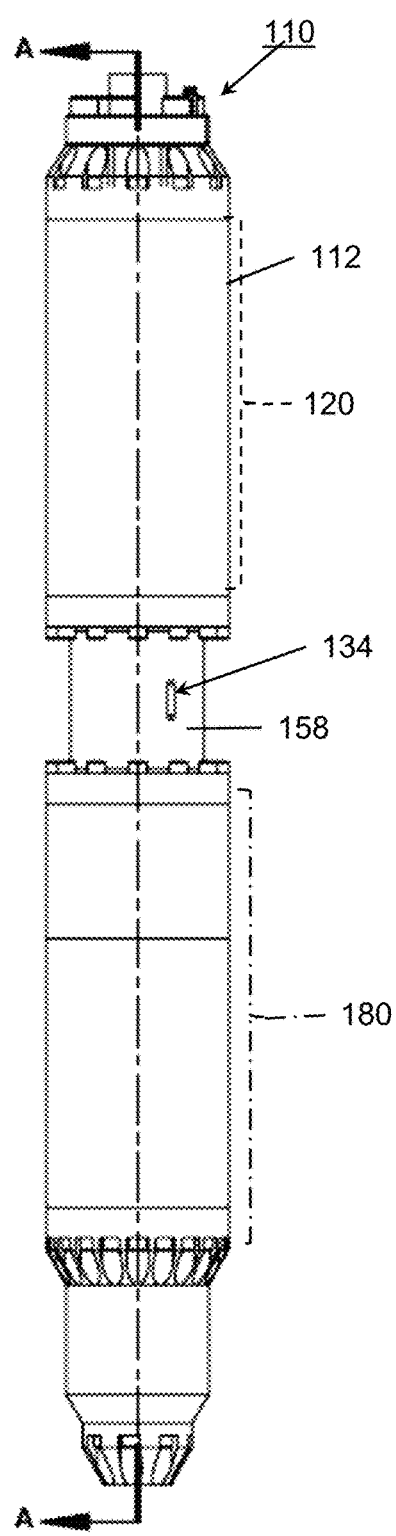
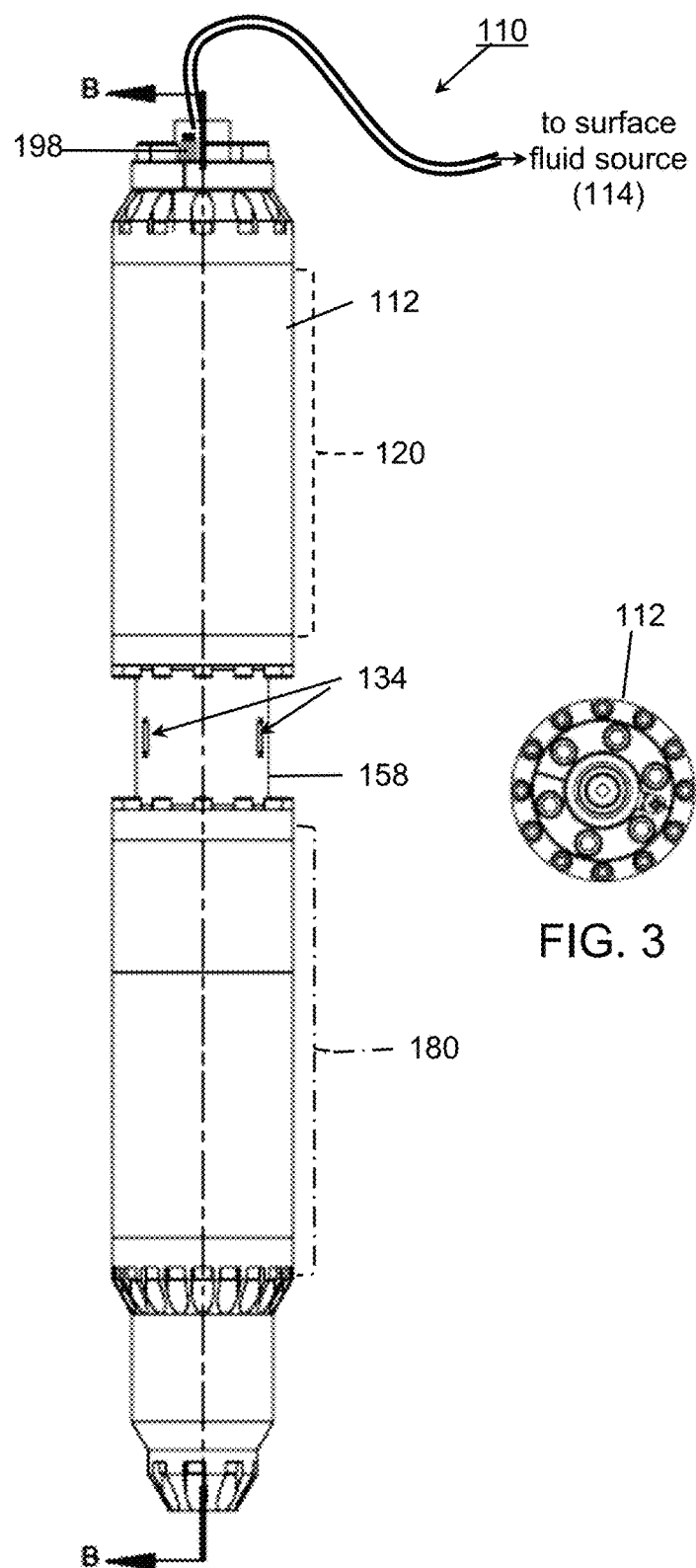
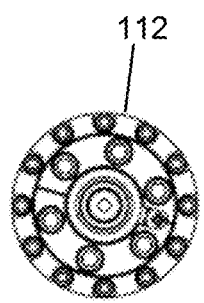
FIG. 1
FIG. 2
FIG. 3

OIL RECOVERY TOOL AND SYSTEM

This application is a continuation-in-part of co-pending U.S. patent application Ser. No. 16/270,020 for an OIL RECOVERY TOOL AND SYSTEM filed Feb. 7, 2019 by R. Valtierra et al., which claims priority under 35 U.S.C. § 119(e) to the following provisional patent applications by Applicant Hydroacoustics, Inc.: U.S. Provisional Application No. 62/627,310 for an OIL RECOVERY TOOL by R. Valtierra et al., filed Feb. 7, 2018; and U.S. Provisional Application No. 62/659,825 for an OIL RECOVERY TOOL by R. Valtierra, filed Apr. 19, 2018; and which also claims priority under 35 U.S.C. § 120 as a continuation-in-part of U.S. patent application Ser. No. 16/263,136 (U.S. Pat. No. 10,704,938) for a FLUID SENSOR AND PUMPJACK CONTROL SYSTEM by R. Valtierra et al., filed Jan. 31, 2019, all of the above-identified applications being hereby incorporated by reference in their entirety.

The disclosed systems and methods are directed to generating acoustic waves. A downhole oil recovery tool provides a seismic source to enhance oil recovery. The systems and methods disclosed herein enhance oil recovery by means of vibratory stimulation, for example, to diminish capillary forces and encourage the rate of migration and coalescence of retained oil within the porous media of an oil reservoir.

BACKGROUND AND SUMMARY

After an oil well has been in operation for a time, its productivity often diminishes to a point at which the operation of the well is marginal or economically unfeasible. It is frequently the case, however, that substantial quantities of crude oil remain in the ground in the regions of these unproductive wells but cannot be liberated by conventional techniques. Often methods for efficiently increasing the productivity of a well are considered, provided they can be performed economically. Often a borehole can serve as an injection or monitor well and may allow for the insertion of a down hole seismic pressure wave generator.

Many methods have been discovered for improving the oil recovery efficiency, including those disclosed in U.S. Pat. No. 8,113,278 to DeLaCroix et al., for a SYSTEM AND METHOD FOR ENHANCED OIL RECOVERY USING AN IN-SITU SEISMIC ENERGY GENERATOR (Feb. 14, 2012), which is hereby incorporated by reference in its entirety. Nonetheless, large volumes of hydrocarbons remain in oil rich formations after secondary, or even tertiary recovery methods have been employed. It is believed that a major factor causing the retention of the hydrocarbons in such formations is an inability to direct sufficient pressure forces on the hydrocarbon droplets residing in the pore spaces of the formations. Conventional oil recovery is typically accomplished in a two tier process, the primary or initial method is reliant on the natural flow or pumping of the oil within the well bore until depletion. Once the free flowing oil has been removed a secondary method is required. Generally an immiscible fluid such as water is forced into an injection borehole to flush the oil contained within the strata into a production well. In the past it has not been cost effective to employ tertiary or enhanced oil recovery (also referred to as EOR) methods, even though up to seventy percent of the total volume of oil may still remain in an abandoned oil well after conventional oil recovery techniques are used.

Another technique that has been employed to increase the recovery of oil employs the introduction of low frequency vibration energy. Low frequency vibration from surface or downhole sources has been used to influence liquid hydrocarbon recoveries from subterranean reservoirs. This type of vibration, at source-frequencies generally less than 1 KHz, has been referred to in the literature as sonic, acoustic, seismic, p-wave, or elastic-wave well stimulation. For example, stimulation by low frequency vibration has been effectively utilized to improve oil production from water flooded reservoirs. Examples from the literature also suggest that low frequency stimulation can accelerate or improve ultimate oil recovery. Explanations for why low frequency stimulation makes a difference vary, however, it is believed that the introduction of vibrational energy causes the coalescence of oil droplets and re-establishment of a continuous oil phase due to the dislodging of oil droplets from the formation so they can re-combine and coalesce. Additionally it is believed that the sound waves reduce capillary forces by altering surface and interfacial tensions, and thereby free the droplets and/or enable them to coalesce. For example, U.S. Pat. No. 5,184,678 to Pechkov et al. issued Feb. 9, 1993 discloses a method and apparatus for stimulating fluid production in a producing well utilizing an acoustic energy transducer disposed in the well bore within a producing zone. However, Pechkov only teaches that ultrasonic irradiating removes fines and decreases the well fluid viscosity in the vicinity of the perforations by agitation, thereby increasing fluid production from an active well.

Ultrasonic waves can improve and/or accelerate oil production from porous media. The problem with ultrasonic waves is that in general, the depth of penetration or the distance that ultrasonic waves can move into a reservoir from a source is limited to no more than a few feet, whereas low frequency or acoustic waves can generally travel hundreds to thousands of feet through porous rock. While sonic stimulation methods and apparatus to improve liquid hydrocarbon flow have achieved some success in stimulating or enhancing the production of liquid hydrocarbons from subterranean formations, the acoustic energy transducers used to date have generally lacked sufficient acoustic power to provide a significant pulsed wave. Thus, there remains a continuing need for improved methods and apparatus that utilize sonic energy to stimulate or enhance the production of liquid hydrocarbons from subterranean formations. Acoustic energy is emitted from the acoustic energy transducer in the form of pressure waves that pass through the liquid hydrocarbons in the formation so that the mobility of the liquid hydrocarbon is improved and flows more freely to the well bore. By way of definition an elastic-wave is a specific type of wave that propagates within elastic or visco-elastic materials. The elasticity of the material facilitates propagation of the wave, and when such waves occur within the earth they are generally referred to as seismic waves.

The value of a barrel of oil and the demand for oil has created a greater interest in tertiary enhanced oil recovery methods to further oil availability through the revitalization of older wells, even including those that have been abandoned due to a high ratio of water compared to the volume of total oil produced, or commonly called the water cut. The primary intent of enhanced oil recovery is to provide a means to initiate the flow of previously entrapped oil by effectively increasing the relative permeability of the oil embedded formation and reducing the viscosity and surface tension of the oil. Numerous enhanced oil recovery technologies are currently practiced in the field including thermodynamics, chemistry and mechanics. Several of these methods have been found to be commercially viable with varying degrees of success and limitations. Heating the oil with steam has proven be an effective means to reduce the viscosity, provided there is ready access to steam energy, and accounts for over half of the oil currently recovered. The use of chemical surfactants and solvents, such as $CO_2$, to reduce the surface tension and viscosity, while effective, are not widely used due to cost, contamination and environmental concerns. However, seismic stimulation lacks any of the aforementioned limitations and continues to be explored as a viable enhanced oil recovery technique.

The low-frequency vibration of reservoir rock formations is thought to facilitate enhanced oil recovery by (i) diminishing capillary forces, (ii) reducing the adhesion between rocks and fluids, and (iii) causing coalescence of oil droplets and enable them to flow within the water flood. Studies at the Los Alamos National Laboratory conducted by Peter Roberts have indicated that this process can increase oil recovery over substantially large areas of a reservoir at a significant lower cost than other enhanced oil recovery stimulation methods.

The systems and methods disclosed herein provide a low-cost tertiary solution to facilitate the reclamation of oil that had previously been uneconomical to retrieve. It is, therefore, a general object of the disclosed embodiments to enable the use of downhole vibratory seismic sources capable of generating elastic-wave vibration stimulation within an oil field to extract the immobile oil. By employing an apparatus for generating acoustic waves, further oil recovery is stimulated within an oil deposit in fluid contact with a borehole into which the acoustic wave source can be placed.

In accordance with the disclosed embodiments, disclosed is an electro-hydraulic seismic pressure wave source configured as an oil recovery tool. The operation of the disclosed oil recovery tool is facilitated by reducing the mechanical complexity of the tool while at the same time improving its overall reliability. The improvements include integration of a motor into the tool, where the motor is specifically designed to operate in a water saturated environment. The rotor of the motor is directly attached to drive a rotating valve that is responsible for creating the seismic wave. The valve is designed with at least one and likely multiple ports for releasing the seismic energy. In one embodiment the oil recovery tool may include smaller ports along its length to implement a tapered hydraulic bearing. With a tapered bearing the valve uses pressurized water as the "bearing" material to reduce friction and may thereby eliminate the need for custom fabricated mechanical bearings. With the coupled rotor and valve, and tapered bearing, the tool is essentially reduced to a single moving (rotating) part. Additionally, the rotor is designed with a hollow shaft that, when attached to the valve, provides a direct path for pressurized supply water entering the tool to flow to the valve. This allows for greater fluid flow and reduction in possible cavitation (bubbles forming in the water). Additional water passages in and around the motor stator provide cooling to the motor during tool operation. Additionally, integration of the water-saturated motor allows the tool to be reduced in diameter relative to prior down-hole tools, thereby allowing it to be employed in a larger range of well bore diameters starting at about 4 inches.

Disclosed in embodiments herein is an oil recovery tool for imparting seismic wave energy within an oil reservoir, in the form of a wave, so as to alter the capillary forces of residual oil comprising: a housing; a source of pressurized fluid; and a, brushless motor, operatively located within said housing to receive the pressurized fluid and generate the seismic waves.

Further disclosed in embodiments herein is an apparatus for generating acoustic waves within a medium to stimulate oil recovery within an oil reservoir, comprising: an elongated and generally cylindrical housing suitable for passing through a borehole; an accumulator; a source of pressurized fluid; an energy transfer section, wherein the energy transfer section may be inclusive of the pressure transfer valve, and further including, a motor; a hollow-shaft rotor having an output port; and a stator having a corresponding output port whereby fluid energy is transferred upon alignment of said rotor and stator ports, wherein the motor is operatively connected to the hollow-shaft rotor and where fluid passes therethrough to the accumulator; and a pressure transfer valve, wherein the pressurized fluid is stored within said accumulator and subsequently transferred, thereby releasing seismic wave energy via the ports into the fluid surrounding the apparatus.

Also disclosed herein is a method for generating seismic pressure wave energy within an oil saturated strata, comprising: placing an acoustic wave generator in contact with a fluid within the strata; accumulating fluid pressure energy within the acoustic wave generator; and periodically releasing and transferring pressure energy with said generator to create wave energy that is transferred by the fluid into a porous medium of the strata, wherein releasing and transferring energy is accomplished by a motor driving a rotary valve generator, said valve generator employing a hollow shaft for fluid passage, whereby the relative relationship of output ports on both a rotor and a stator within the fluid generator controls the release and transfer of a systematic pressure pulse to create the seismic pressure wave energy.

Further disclosed herein is an oil recovery system for enhancing the recovery of oil within a reservoir, including: a source of pressurized fluid; a submersible oil recovery tool for imparting seismic wave energy within the oil reservoir, in the form of a wave, so as to alter the capillary forces of residual oil therein, comprising, a housing; and a brushless motor, operatively located within said housing to receive the pressurized fluid and generate the seismic waves; and a control system suitable for monitoring and controlling the system components including at least the oil recovery tool and the source of pressurized fluid to produce seismic waves within the reservoir.

Also disclosed herein is a system for generating acoustic waves within a medium to stimulate oil recovery within an oil reservoir, comprising: a source of pressurized fluid, wherein said source of pressurized fluid includes a replenishable fluid reservoir and a pressurization system for pressurizing the fluid from said reservoir and passing the pressurized fluid through a conduit, the conduit terminating at an opposite end at an oil recovery tool, said oil recovery tool including; an elongated and generally cylindrical housing suitable for passing through a borehole; an accumulator; an energy transfer section including, a motor, a hollow-shaft rotor having an output port, and a stator having a corresponding output port whereby fluid energy is transferred upon alignment of said rotor and stator ports, wherein the motor is operatively connected to the hollow-shaft rotor and where fluid passes therethrough to the accumulator; a pressure transfer valve, wherein the pressurized fluid is stored within said accumulator and subsequently transferred, thereby releasing seismic wave energy via the ports into the fluid surrounding the apparatus; and a control system suitable for monitoring and controlling at least the oil recovery tool and the source of pressurized fluid to produce seismic waves within the reservoir.

BRIEF DESCRIPTION OF THE DRAWINGS

FIGS. 1-3 are front, side and top illustrations of an embodiment of the oil recovery tool;

Figure 4:
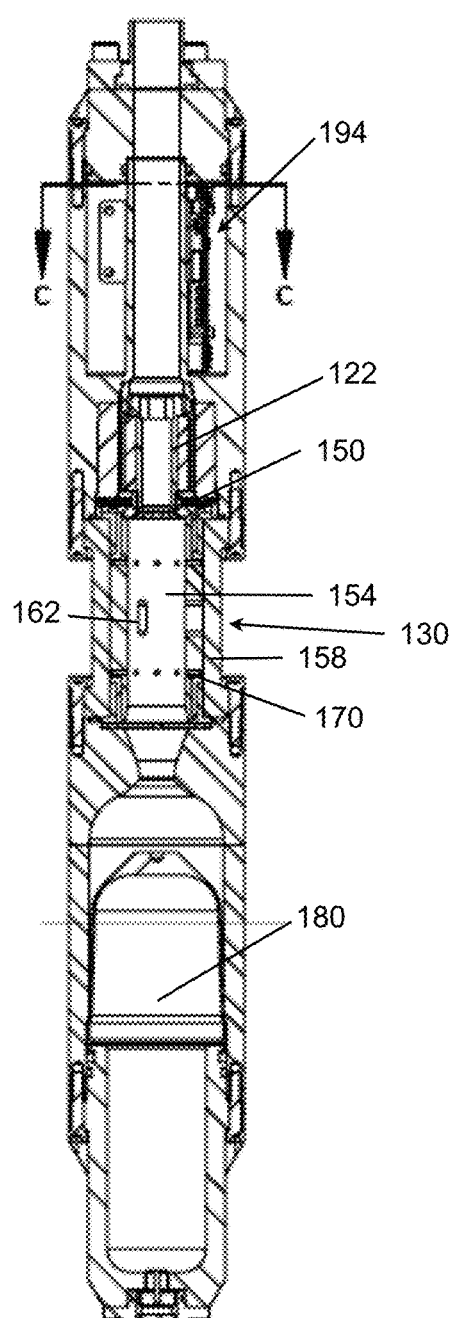
FIGS. 4 and 5 are, respectively, cross-sectional views of FIGS. 1 and 2 along lines A-A and B-B.
Figure 5:
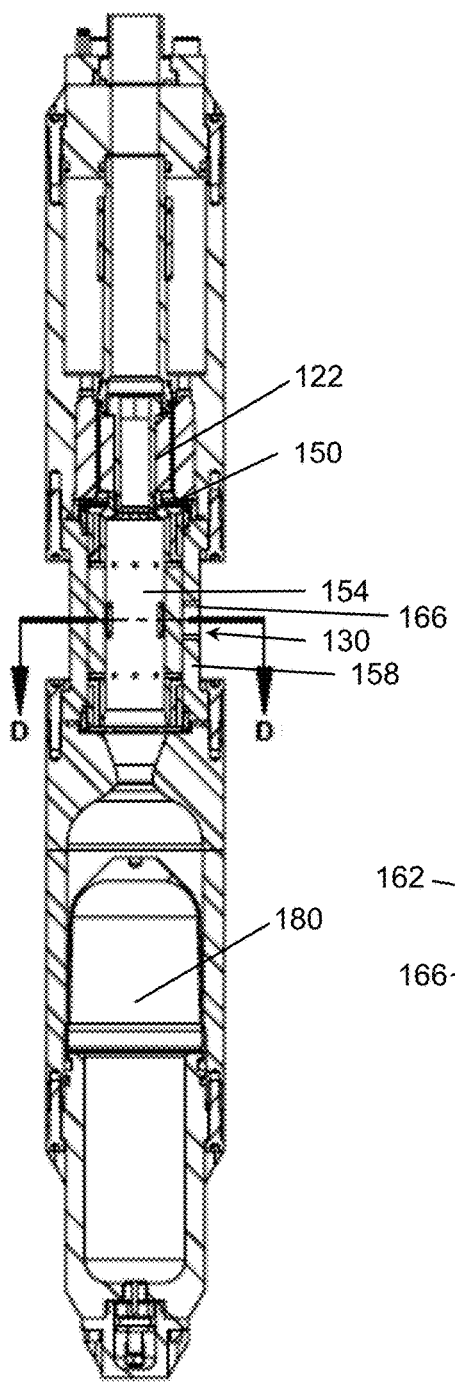
Figure 6:
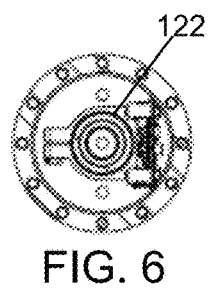
FIGS. 6 and 7 are, respectively, cross-sectional top views of FIGS. 4 and 5 along lines C-C and D-D.
Figure 7:
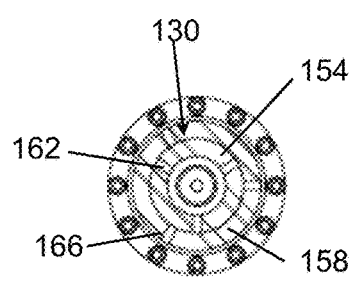
Figure 8:
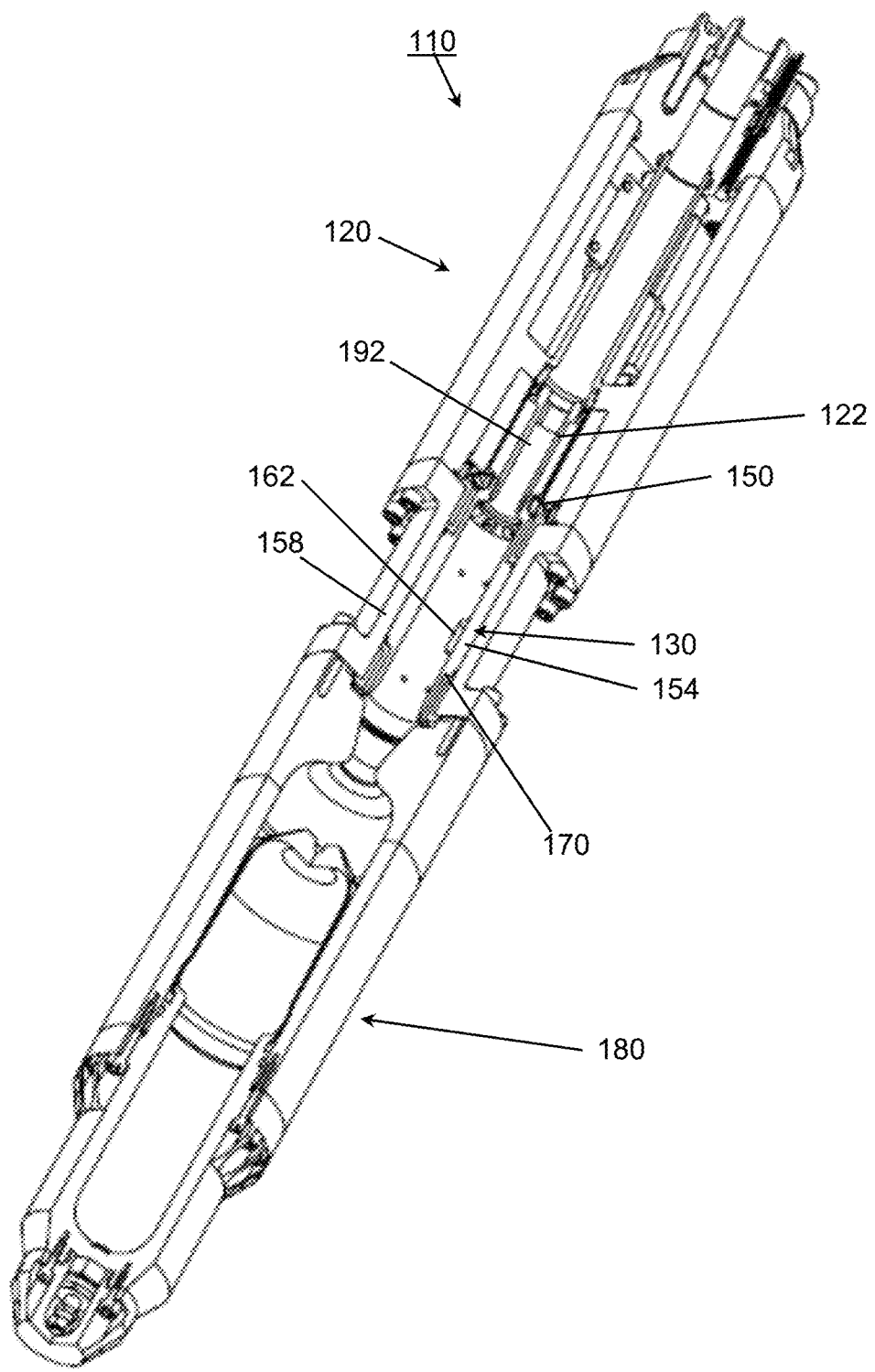
FIG. 8 is a partial cut-away illustration of an embodiment of the oil recovery tool.

The various embodiments described herein are not intended to limit the disclosure to those embodiments described. On the contrary, the intent is to cover all alternatives, modifications, and equivalents as may be included within the spirit and scope of the various embodiments and equivalents set forth. For a general understanding, reference is made to the drawings. In the drawings, like references have been used throughout to designate identical or similar elements. It is also noted that the drawings may not have been drawn to scale and that certain regions may have been purposely drawn disproportionately so that the features and aspects could be properly depicted.

DETAILED DESCRIPTION

Early oil recovery tool (ORT) embodiments employed pressurized fluid released in pulses as described herein. Such tools required complex mechanical components and internal fluid pathways, bearings with seals to provide fluid to the tool and to produce suitable seismic energy or waves. Earlier tools also required a separate pump(s) to gather and pressurize fluid.

Oil Recovery Tool

The oil recovery tool embodiments 110 described herein may be employed for imparting seismic wave energy (e.g., in the form of a wave) within an oil reservoir, so as to alter the capillary forces of residual oil. The tool comprises: a housing 112; a source of pressurized fluid 114 and electrical power. And, as described relative to FIGS. 1-13, the housing integrates a water-saturated, brushless motor, operatively located within the housing to receive the pressurized fluid and turn a rotor relative to a stator and align respective ports therein to generate the seismic waves.

In accordance with the improved embodiments depicted in FIGS. 1-13, an electro-hydraulic seismic pressure wave source is illustrated, configured as an oil recovery tool 110. The operation of the disclosed oil recovery tool 110 is facilitated by reducing the mechanical complexity of the tool while at the same time improving its overall reliability. The improvements in one embodiment include integration of a motor assembly (e.g. water-saturated) 120 into the tool, where the motor is specifically designed to operate in a water-saturated environment. The rotor 122 of the motor is directly attached to drive the rotor of a rotating valve assembly 130 that is responsible for creating the seismic wave. The valve assembly, which may also be characterized as the acoustic wave generator, is designed with multiple ports 134 (166) for releasing the seismic energy, and with the addition of smaller ports 136 along its length to implement a tapered hydraulic bearing. The ports have a cross-sectional slot shape, but may also have shapes such as circles, squared notches, etc. to alter the profile and characteristics of the generated seismic wave. It will be further contemplated that the valve assembly or acoustic wave generator portion of the oil recovery tool 110 may employ alternative mechanisms for opening and closing the ports 136 in a controlled fashion to generate the acoustic or seismic waves.

The valve assembly rotor 122 may be supported for rotation relative to the surrounding stator using any of a number of possible bearing techniques, including friction-less materials such as Teflon® to support surfaces of the rotor. Also contemplated are customized rolling bearings employing conventional inner and outer rings supported by balls or rollers and including seals to reduce friction due to bearing contamination. In another embodiment a tapered bearing valve uses pressurized water (from source 114, flowing through the motor assembly 120 and the rotor 154) as the "bearing" material to reduce friction and thereby eliminate the need for custom fabricated mechanical bearings and associated seals. With the coupled rotor and valve assembly, and tapered bearing, the tool is essentially reduced to a single moving (rotating) part—the rotor 154 of the valve assembly, driven by the attached rotor 122 of motor 120. Additionally, both rotors are designed with a hollow shaft or core 126 that, when attached to the valve assembly, provides a direct path for pressurized supply water entering the tool 110 to flow through the motor to the valve assembly and the accumulator 180. This allows for greater fluid flow and reduction in possible cavitation (bubbles forming in the water). Additional water passages in and around the motor stator (e.g., passages 116 in FIGS. 9-10) provide cooling to the motor during tool operation. Additionally, integration of the fluid-saturated or water-saturated motor; allows the tool outer housing 112 to be reduced in diameter relative to prior tool designs, thereby allowing the current embodiment to be employed in a range of smaller well diameters, with bore diameters starting as small as about 4.0 inches.

While FIGS. 1-13 illustrate a linear ordering of the motor 120, valve (e.g., rotor and stator), and accumulator 180, it will be appreciated that a fluid-saturated motor allows for alternative arrangements of such components. For example, when the tool 110 is considered in an operative position within a borehole or fluid reservoir, the oil recovery system may include an accumulator positioned below the rotary valve as depicted, or the accumulator may be positioned above the rotary valve. Moreover, in one contemplated embodiment, wherein the accumulator is positioned above the rotary valve, the motor may be positioned below the rotary valve.

Turning to FIGS. 1, 4-5 and 8-10 specifically, depicted therein are cross sectional and cut-away illustrations of the oil recovery tool (ORT) 110 embodiments and the assembled mechanical components. Specific components are labeled and include, for example, motor assembly 120, upper bearing surface 150, rotor 154, stator 158, rotor port or orifice 162, stator port or orifice 166, lower bearing surface 170, and pressure accumulator 180. From FIGS. 1-10 one can see how the motor assembly and rotating valve are operatively coupled together into a single rotating part and how they are compactly integrated into tool 110.

Figure 9:
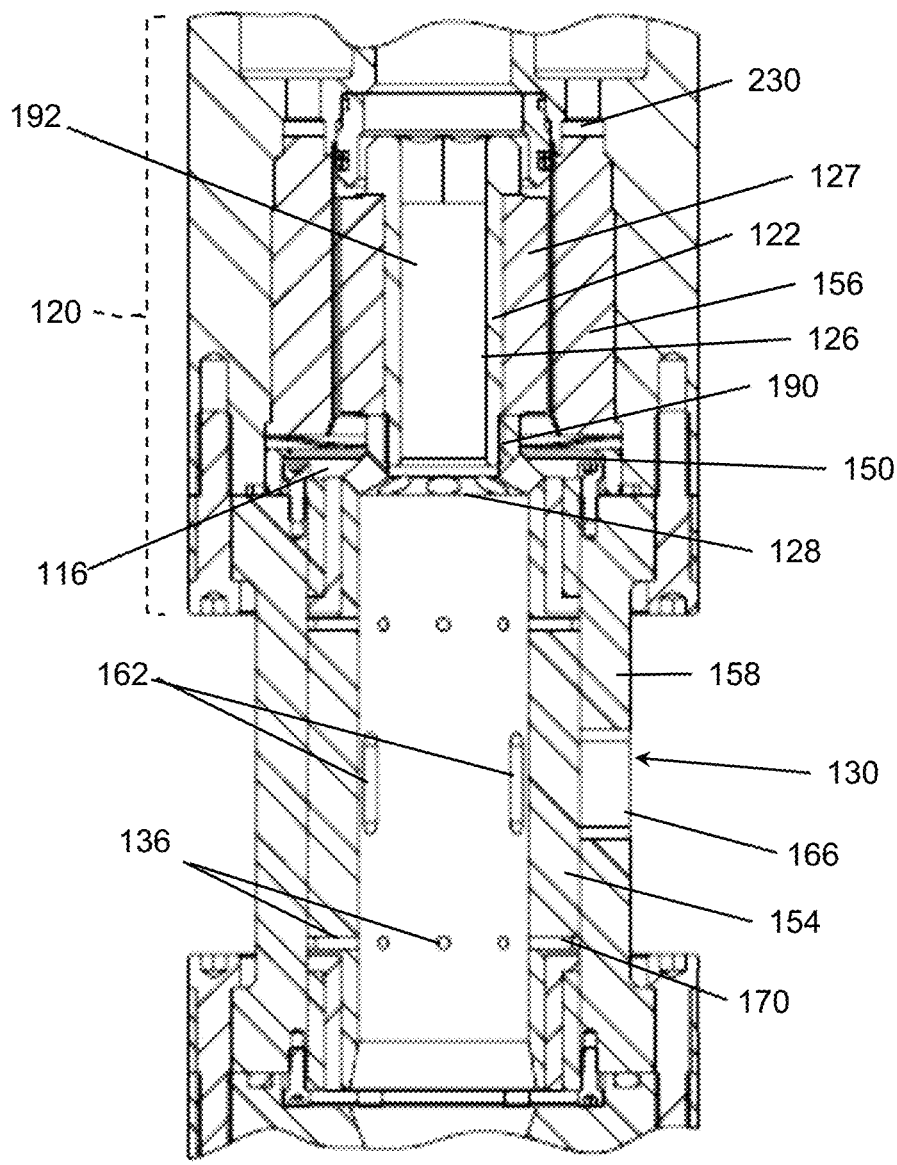
FIGS. 9 and 10 are enlarged cross-sectional illustrations of alternative embodiments for the motor assembly and port portions of the oil recovery tool.
Figure 10:
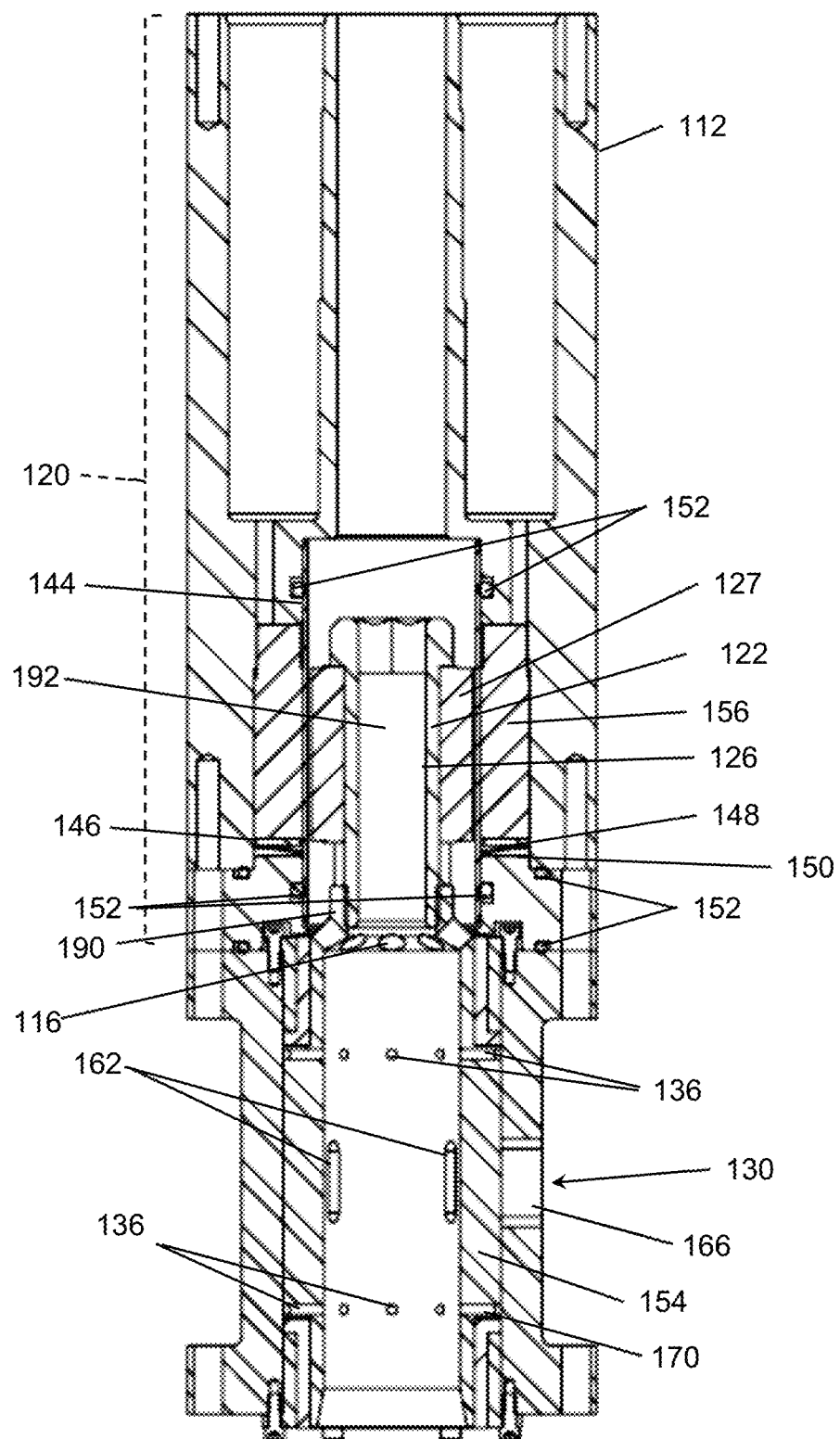

Considering FIGS. 9 and 10, depicted are enlarged views of the motor assembly 120 in two alternative embodiments of the tool 110. The motor stator 156 and rotor 122 are shown and the rotor rotates within the stator. The interface 128 to valve 130 is depicted along with a custom threaded screw 190, which attaches the motor rotor to the valve. As more fully illustrated in FIGS. 11-13, the rotor includes a core surrounded by permanent magnets 127. The rotor rotates inside of the stator. In one embodiment the stator includes the motor windings, which receive power to control operation of the motor from the surface via wires passing through the bulkhead. In the illustrated embodiment of FIGS. 1-8, to increase the downhole range (depth) of the tool 110, a motor controller 194 may also be incorporated within the tool housing such that the electrical connections to the surface need only include power and control signals. The motor controller 194 is part of a small printed circuit board or similar electronics assembly that is suitable to installation within housing 112, and the motor assembly 120 is connected to and powered-by the controller via wires 196.

Referring to FIG. 10, the alternative design of the motor assembly section 120 of the tool 110 is illustrated. In the alternative design, certain components are modified or added, some to adapt tool 110 to higher pressures with an extended downhole depth. The modifications further serve to prevent water ingress into the controller chamber and eliminate erosion of the potting material caused by pressurized liquid. Some of the changes include a stator 158 that is no longer potted in place. Also, O-rings 152 are larger (e.g., longer and/or thicker) to accommodate higher operating pressures of up to 4000 psi, and to provide increased isolation of the motor stator from the casing and surrounding components. The motor assembly 120 may include a longer or extended titanium sleeve 144 needed to accommodate the additional isolation O-rings 152 located at the top and bottom of the motor stator chamber. The stator 156 of motor assembly 120 is also biased in an upward position by a spacer 146 pressed against the lower end of the stator by a wave spring 148 resting on shoulder 150. The ring-shaped spacer 146 further protects the motor potting material from damage by wave spring 148, by distributing the spring load and thereby reducing vibration and pulsing being transmitted directly from the spring to the potting material.

Calling attention to the screw 190, the hollow aspect of the screw can be seen to illustrate a passage 192 for water to be fed to the valve directly through the motor. Depicted in red is a custom bulkhead connector 198 used to route electrical wiring from the motor out of the tool 110.

Figure 11:
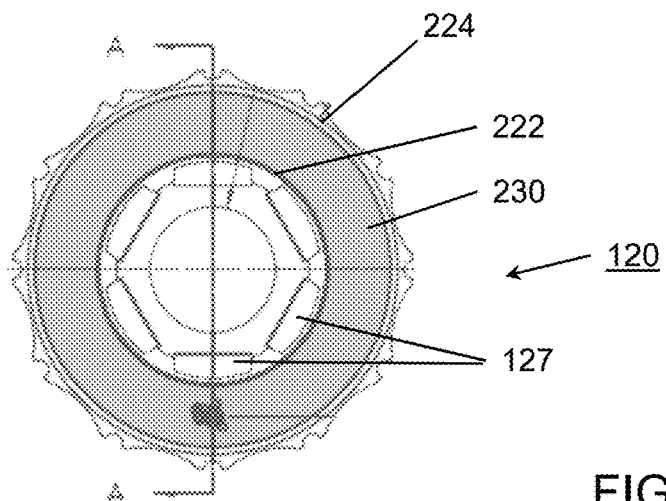
FIGS. 11-13 are illustrations of various components for an exemplary drive motor for the oil recovery tool of FIG. 1, with FIG. 12 depicting a cross-section along lines A-A of FIG. 11.
Figure 12:
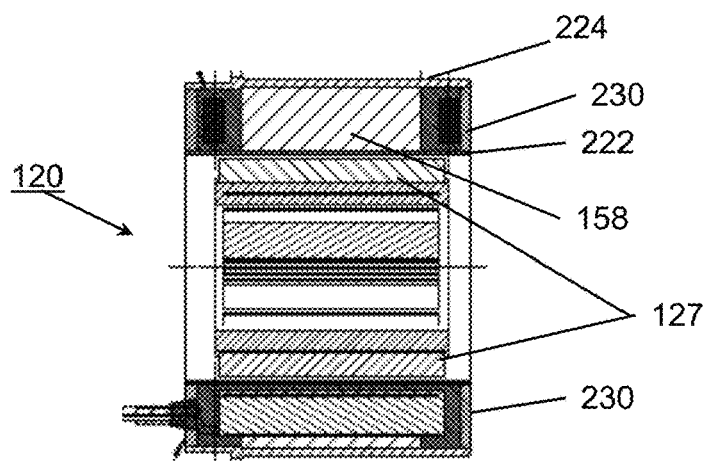
Figure 13:
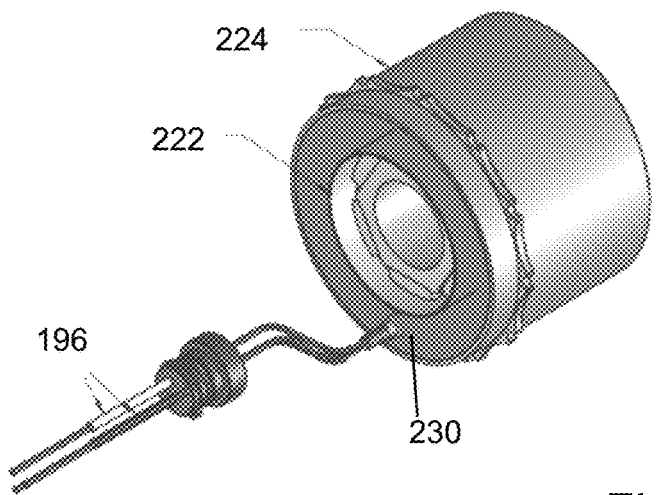

Turning next to FIGS. 11-12, depicted therein are details of the motor assembly 120. There are inner (e.g., titanium) and outer (e.g., stainless steel) metal "shells" 144, 222 and 224 respectively, placed adjacent the stator 158 along with potting resin 230 to protect the motor against environmental wear, corrosion and stress resulting from high pressure water, water flow induced wear, etc. As previously noted relative to the embodiment of FIG. 10, the motor stator 158 may be isolated from the environment by the O-ring seals 152.

In summary, the oil recovery tool 110 is an apparatus for generating acoustic/seismic waves within a medium to stimulate oil recovery within an oil reservoir. The oil recovery tool embodiments 110 described include: an elongated and generally cylindrical housing 112 suitable for passing through a borehole (not shown). The housing may be made from one or a combination of materials including stainless steel (304, 409 or 2507) or plated steel (e.g., electroless nickel, nickel-boron or SeaTEC 100). The tool includes an accumulator 180 for accumulating a reservoir of pressurized fluid, for example, from a surface source. In one embodiment the accumulator 180 includes commercial off the shelf components, such as a rubber bladder that decouples the pulsations from the pressure supply source. While various techniques may be employed to provide an accumulator to collect pressurized fluid for release through the ports, in one embodiment of the tool, the pressure is released multiple times (e.g., twice) during each complete rotation)(360° of the rotor 122; where the ports are generally closed but opened for about 5°-15° of each half-rotation. The effective area of the port or opening (e.g., axial length x rotational length), in conjunction with the accumulator size and fluid pressure, govern the pressure drop, and associated acoustic energy release over each discharge cycle. It is also possible that a wider or a longer slot 162, 166 (greater area), all other aspects being constant, will reduce the average pressure in the accumulator. In addition to the port size, the port shapes may be customized to change the harmonic content and the nature of the acoustic pulse created by the tool.

The tool also includes an energy transfer section inclusive of the pressure transfer valve and includes the motor 120, a hollow-shaft rotor 154 having an output port, and a stator 158 having a corresponding output port whereby accumulated fluid energy is transferred through the output ports upon alignment of the rotor and stator ports, and where the motor is operatively connected to the hollow-shaft rotor (and fluid passes therethrough to the accumulator). A pressure transfer valve is employed, wherein the pressurized fluid is stored within the accumulator and subsequently transferred, thereby releasing seismic wave energy to the surrounding borehole fluid/strata via the ports.

As will be appreciated, a method for generating a pressure wave within an oil saturated strata using the oil recovery tool 110 may comprise: placing the tool in contact with a fluid within the strata; accumulating fluid pressure energy (e.g., an acoustic wave) within the tool; and periodically releasing and transferring pressure energy with the tool to create wave energy via releasing the fluid into a porous medium of the strata, where releasing and transferring energy is accomplished by the motor driving a rotary valve generator—the tool employing a hollow shaft for fluid passage, whereby the relative relationship of output ports on both a rotor and a stator within the housing controls the release and transfer of a systematic pressure pulse or wave.

Output Monitoring

Having described the oil removal tool, attention is turned to a fluid sensing system suitable for sensing the fluid being removed from a well. Referring to FIGS. 14-17, depicted therein are various views of a fluid sensor 610. In the illustrated example, fluid sensor 610 includes a 2-dimensional venturi 620, where the venturi causes pressurized fluid(s) pumped therethrough to take the form of a controlled thickness of non-stratified fluid as the fluid flows. The 2-dimensional venturi 620 reduces or eliminates stratification of the fluid flowing therethrough as a result of the combination of the 2-dimensional venturi region and the "necking" down of the incoming cylindrical fluid passage 622 into a thin, planar region 624. Venturi 620 also includes a first fluid pressure sensor 630 located on inlet 632 to the venturi to measure a pressure for the pumped input fluid. A second fluid pressure sensor 640 is located on the outlet side 642 of the venturi 620 to measure a pressure of the output fluid. It will be noted that one or both sensors 630 and 640 may also be suitable for sensing the temperature of the fluid passing thereby to provide fluid temperature data as well as pressure data.

In one embodiment, venturi 620 may be 3D printed from stereolithography-compatible resin or similar non-magnetic material. It is also contemplated that the venturi may be injection-molded or machined using other well-known techniques. For durability, the venturi or other sensor components may be incorporated into a metal pipe (e.g., FIG. 14) and potted using a durable epoxy resin. The pressure sensors 630 and 640 are sensors that may be obtained from TE Connectivity company, for example Part No. MS5803-05BA. While a fluid sensor 610 made with polymeric components such as polyvinyl chloride (PVC), etc.) may be suitable for relatively limited (low) pressures in ranges of up to 50 psi or even 70 psi, it will be appreciated that the fluid sensor may also be designed for use in higher-pressure applications exceeding 70 psi. For example, with alternative materials and seals (e.g., thicker-walled steel or stainless steel components, high-pressure gaskets and seals, etc.), the disclosed sensor may be employed on pressurized wells and the like. In such an embodiment, use of a differential pressure probe(s) is contemplated to handle the increased range of pressures that the venturi sensor may experience.

Another aspect of the 2-dimensional venturi 620 is that it provides large planar regions 624 on either side thereof to which a capacitive sensor 660 is attached adjacent the venturi. More specifically, the capacitive sensor includes a pair of parallel conductive metal plates 664 (e.g., made of copper, brass, etc., and of approximately 5 sq. in. and 0.01 in. thickness) located on each side of the 2-dimensional venturi. In one embodiment copper plates are employed as it is easy to cut them to the appropriate size, and a conventional solder may be employed to attach electrical wire leads to the sensor plates 664. A capacitance measured between the plates is output as a dielectric strength of the fluid flowing through the venturi, where the capacitance allows for the characterization of the fluid—and in particular the ability to distinguish between the presence of water versus oil flowing through the sensor by the relative difference in dielectric strength.

Using the pressure differential measures as a difference between the outputs of the first pressure sensor 630 and the second pressure sensor 640, it is possible to determine a fluid flow rate as a result of both the size of the 2-dimensional venturi and/or calibration of the venturi itself. Accordingly, the fluid sensor 610 allows the device to determine a fluid flow rate as a function of the input fluid pressure from sensor 630 and output fluid pressure from sensor 640.

Figure 14:
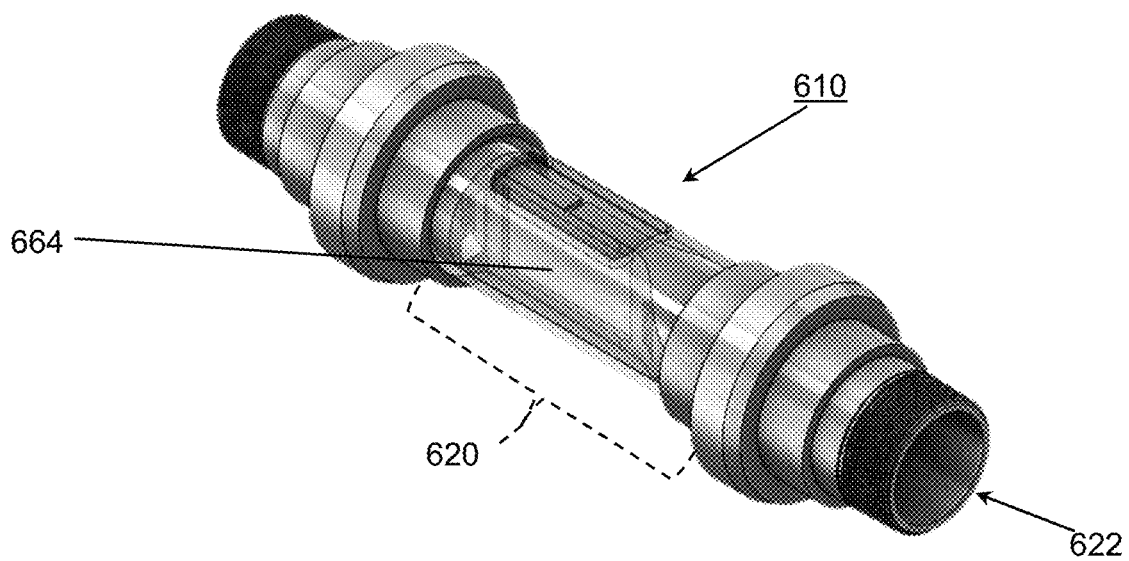
FIGS. 14-17 are illustrations of various embodiments and applications for a venturi-based sensor in accordance with the disclosed system and method.
Figure 17:
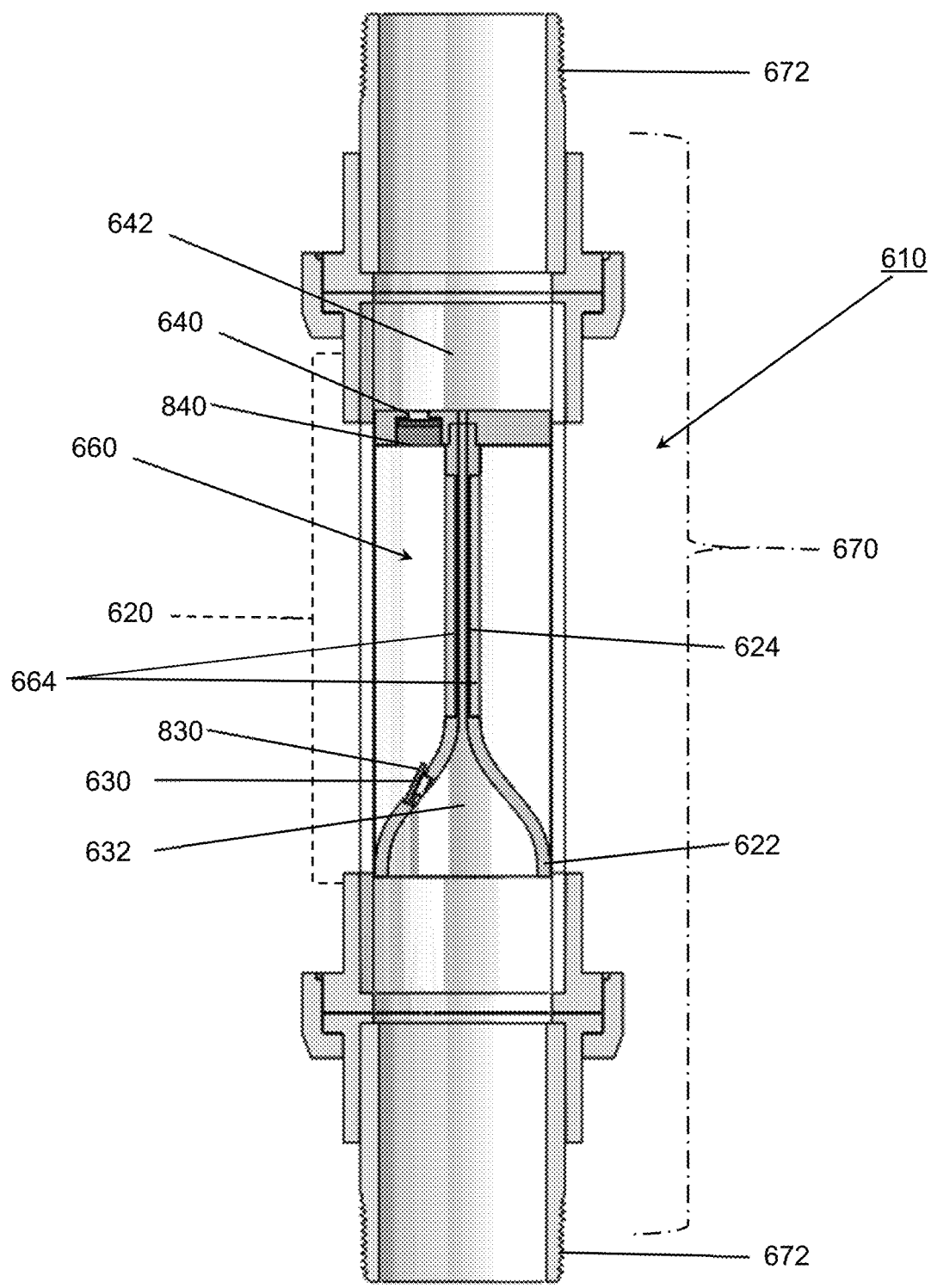
Figure 18:
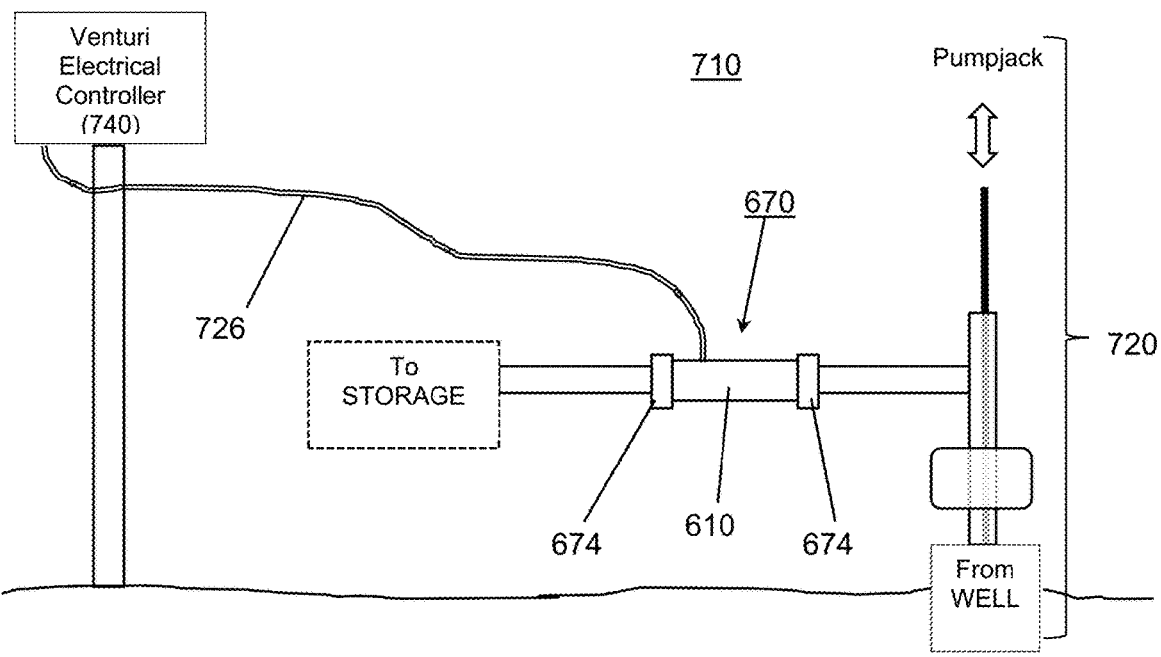
FIGS. 18-19 are, respectively, illustrative examples of a method of installing a venturi sensor, and monitoring and control circuitry for incorporating the sensor into a pump-jack well system.

In one embodiment, such as that depicted in FIGS. 14 and 17, the sensor 610 is contained within a housing 670, which is outfitted with standard threaded nipples 672 or similar couplings 674 on either end thereof to provide the sensor as a complete unit suitable for being plumbed or retrofitted in-line into a pumpjack well piping system such as depicted in FIG. 18. Moreover, as a result of the depicted design, the venturi 620 and sensor 610 are completely self-draining after the pumpjack is shut down, thereby avoiding fluid (e.g., water) collection and potential damage to the sensor due to freezing conditions, etc. As previously suggested, the use of a 2-dimensional venturi design, in combination with the necking-down of the cylindrical pipe cross-section to a linear slit at the entrance to the venturi (see e.g., end view of planar region 624 in FIG. 16), avoids fluid stratification. Another characteristic of the disclosed sensor embodiment is the maximization of the capacitive plate surface area while maintaining a compact sensor assembly.

Figure 19:
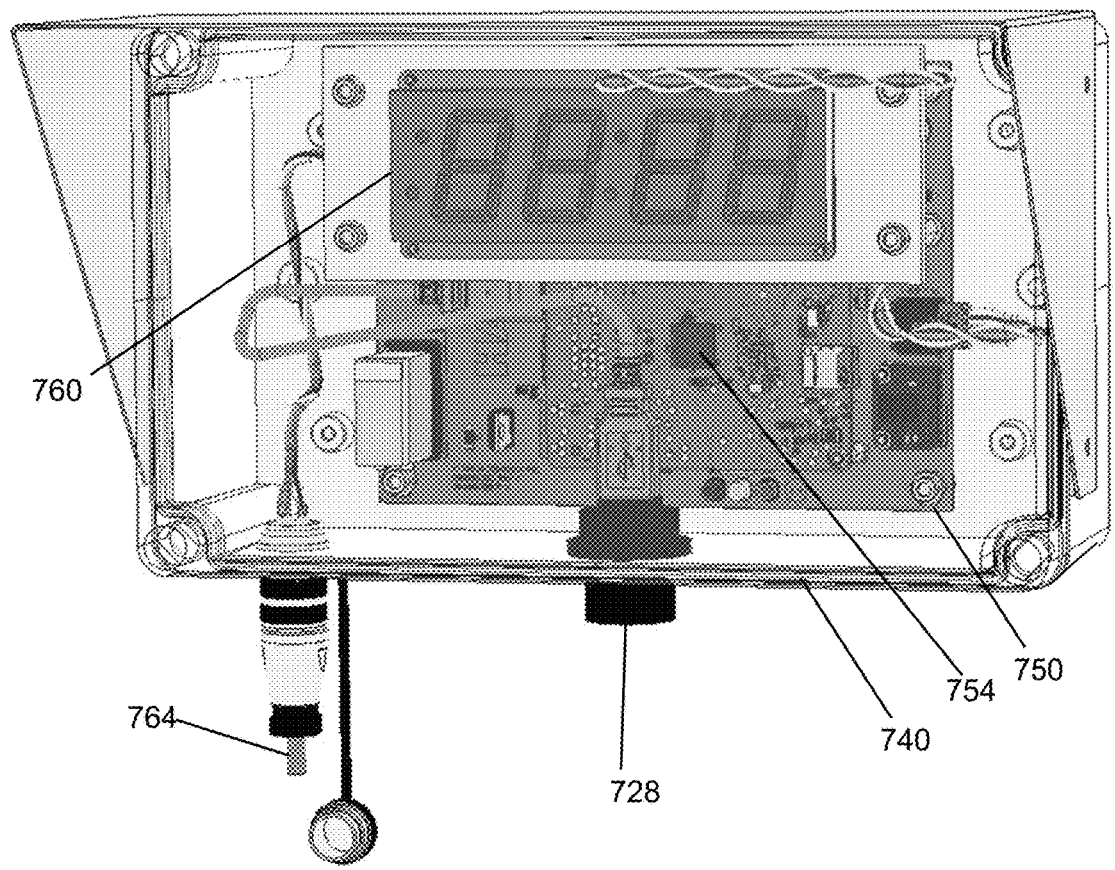

Having described the details of the fluid sensor 610, attention is also turned to FIGS. 18-19, which are provided to illustrate an embodiment of a pumpjack monitoring and control system, as well as the data collected from the system and processed. More specifically, a pumpjack monitoring and control system 610, such as depicted in FIGS. 18-19 may consist of or include an in-line fluid sensor 610 in a housing 670, where the sensor is operatively coupled or plumbed, for example via couplings 674, to receive the fluid output of a pumpjack 720 connected to a wellhead. In the depicted configuration, sensor 610 is used to generate and output pressure and capacitance signals in response to the fluid output, the output signals being transmitted via a wire or cable 726 to control and logging circuitry within the venturi electrical controller 740. The fluid sensor, as described above, includes a first fluid pressure sensor at the inlet to the venturi, a second fluid pressure sensor at an outlet of the venturi, and a capacitive sensor along the 2-dimensional venturi, where the capacitive sensor includes a pair of parallel conductive metal plates on each side of the 2-dimensional venturi.

The system 710 also consists of or comprises a controller 740, operating a micro-processor or similar microcontroller 754 in accordance with a set of pre-programmed instructions. The controller 740 includes a printed circuit board 750, with an I/O port that receives output from the fluid sensor 710 via the cable 726 connected at port 728, and processes the output signals. In addition to data retrieval the connections to other devices may enable the exchange of information other than sensor data, including programmatic upgrades and the like. In one operating mode, the controller 740 (e.g., a single board computer available from Texas Instruments company) may operate simply as a data collection device, receiving and storing the sensor output signals in memory (not shown), including converting the signals from an analog output into a digital value for storage. Also included is a pin-type plug or port (e.g., 4-pin) 764, providing wired connectivity for to the pumpjack (e.g., power and motor control signals). Wireless connectivity is also provided via a localized Bluetooth or Wi-Fi connection between the controller and a portable computing device (not shown), and also contemplated is a mobile telephony or satellite link that may be integrated into controller 240 to facilitate remote data exchange. Furthermore, a digital display 260 may be provided with controller 240, to provide status or operational information as well as real-time output of pressure or other data. Although not shown it will be appreciated that the system 210 further includes a power source, which may include one or more batteries for primary or backup power.

Figure 15:
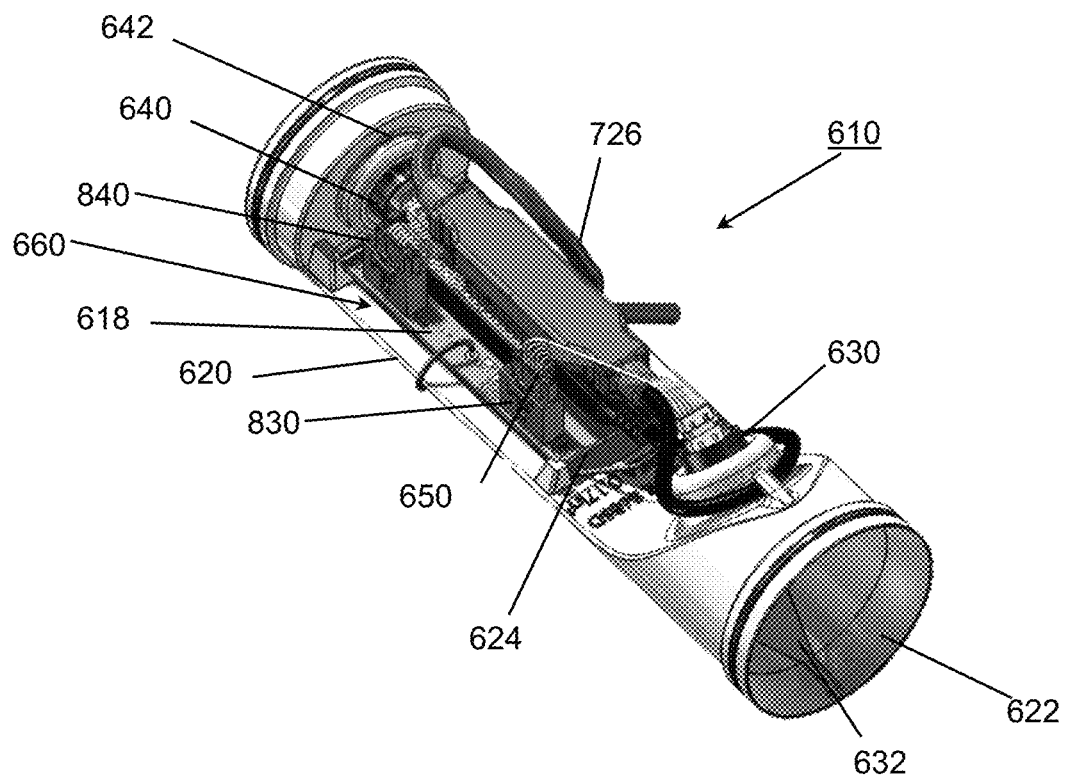
Figure 16:
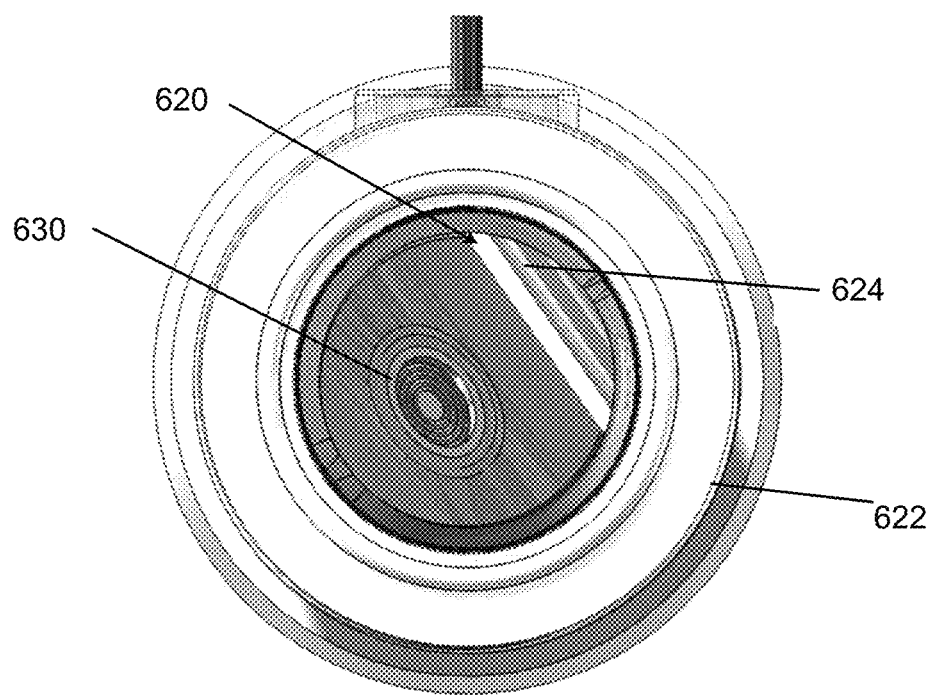

Referring briefly to FIGS. 18-19, in one embodiment the venturi sensor may include an embedded digital controller with which it communicates with controller 740 via a digital UART signal (e.g., RS232). The venturi sensor system sends pre-digitized values for pressure, temperature, and capacitance to the controller. The electronics assembly is placed into an enclosure such as a pipe, and is then filled (potted)

with epoxy. A center electronics board includes the microcontroller, which communicates with the pressure sensors 630, 640, measures capacitance, stores and transmits a digital stream of sensor data to the pumpjack controller 740. Two outer boards, 830, 840 may be used for mounting the pressure sensors. Alternatively, as illustrated in FIG. 15, the pressure sensors 630 and 640 are directly coupled to the electronics board 618 via a wired harness or bus. For example, employed in one embodiment is a digital bus 650 (ribbon cable) that the microcontroller uses to communicate with the pressure sensors. The embedded digital controller is primarily employed to convert the analog sensor signals to digital signals to mitigate noise that is usually associated with a transmitted analog signal (especially when measuring capacitance). Lastly, the ability to sense temperature of the fluid flowing through the sensor allows for a more accurate characterization of the fluid pressures.

In another embodiment, the controller, or another computer processor (not shown) to which the controller 740 is linked (wired (e.g., port 728) or wirelessly), may use the output signals to monitor the pumpjack output and, based upon such signals, analyze and report the performance of the pumpjack as, for example, depicted in FIGS. 20-24. Moreover, the controller or other computer may process the output signals to totalize the amount of oil and/or water pumped from the wellhead over a period of time based upon the differential pressure data between the first and second pressure sensors. As noted above, the pumpjack monitoring and control system may include a wireless transceiver for communicating data with another computerized device.

The pumpjack monitoring and control system 710 may also process the data from the sensor 610 and modify the operation of the pumpjack to optimize extraction of oil from the wellhead. For example, the system may be employed to determine, based upon real-time output signals from sensor 610, whether oil, water or gas are being pumped and passed through the sensor. And, based upon such a determination the pumpjack operation may be continued, stopped or otherwise adjusted accordingly. As an example, upon detecting the pumping of oil, the operation of the pumpjack is continued whereas upon the detection of water or gas the operation of the pumpjack may be stopped or modified. In one embodiment, the system determines or distinguishes the type of fluid in the sensor based upon the pressure and capacitance signals being generated by the sensor. For example, the system may employ one or more of the following rules:
  a) oil=high stroke pressure in combination with low capacitance;
  b) water=high stroke pressure in combination with high capacitance; and/or
  c) gas=low stroke pressure in combination with low/oscillating capacitance.

Figure 20:
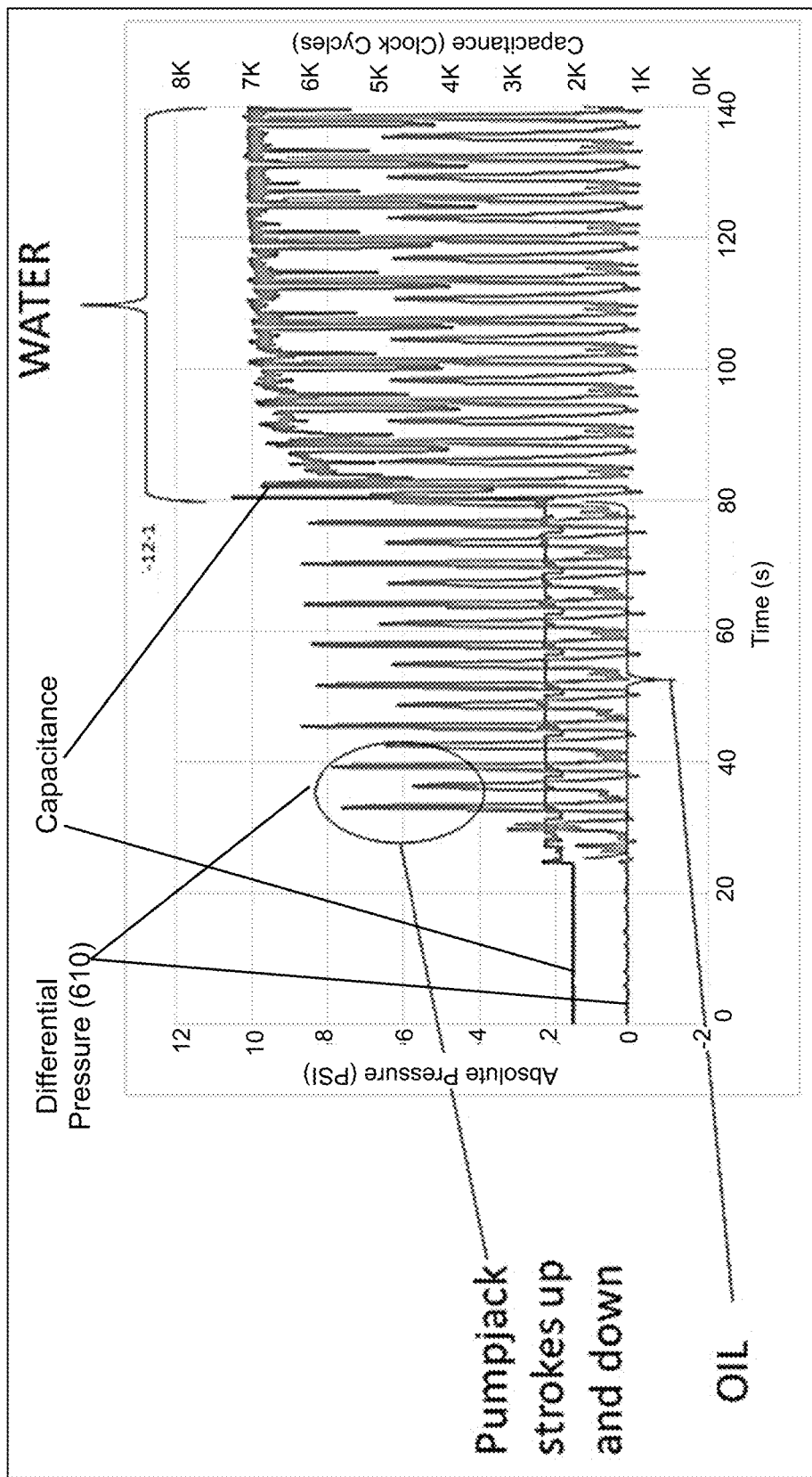
FIGS. 20-24 are illustrative graphs of exemplary pressure and capacitance data generated by the disclosed sensor and control system.

As illustrated in FIG. 20, for example, each stroke of the pumpjack creates a pressure "spike" in the differential pressure (610) between the input and output sensors (630 and 640, respectively). And, when the fluid transitions from oil to water, at approximately 80 seconds in the chart, the change in the pressure profile (slight decrease in peak pressure due to water) is concurrent with a similar increase in the measured capacitance (also consistent with water instead of oil being present in the 2D-venturi).

Figure 21:
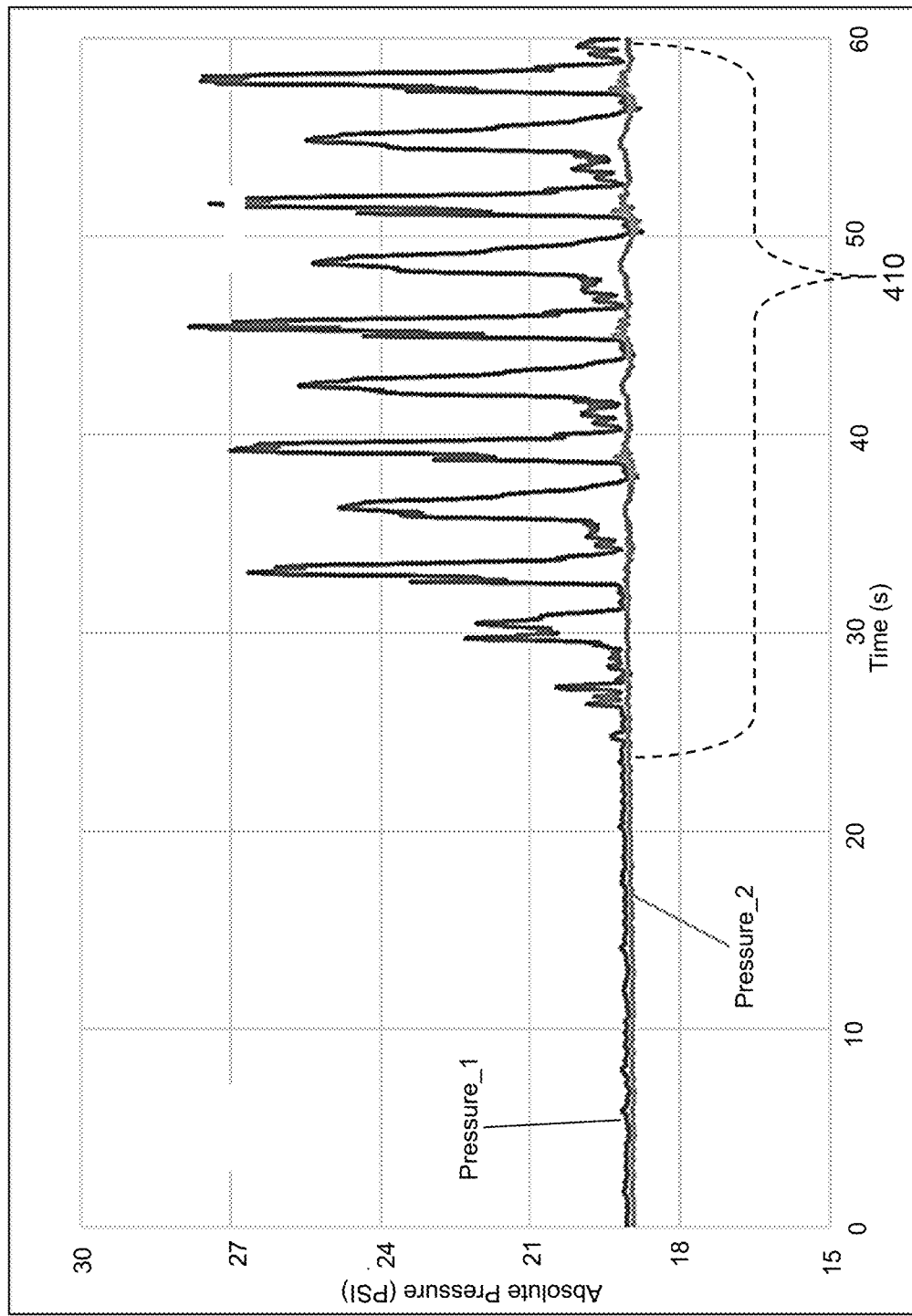
Figure 22:
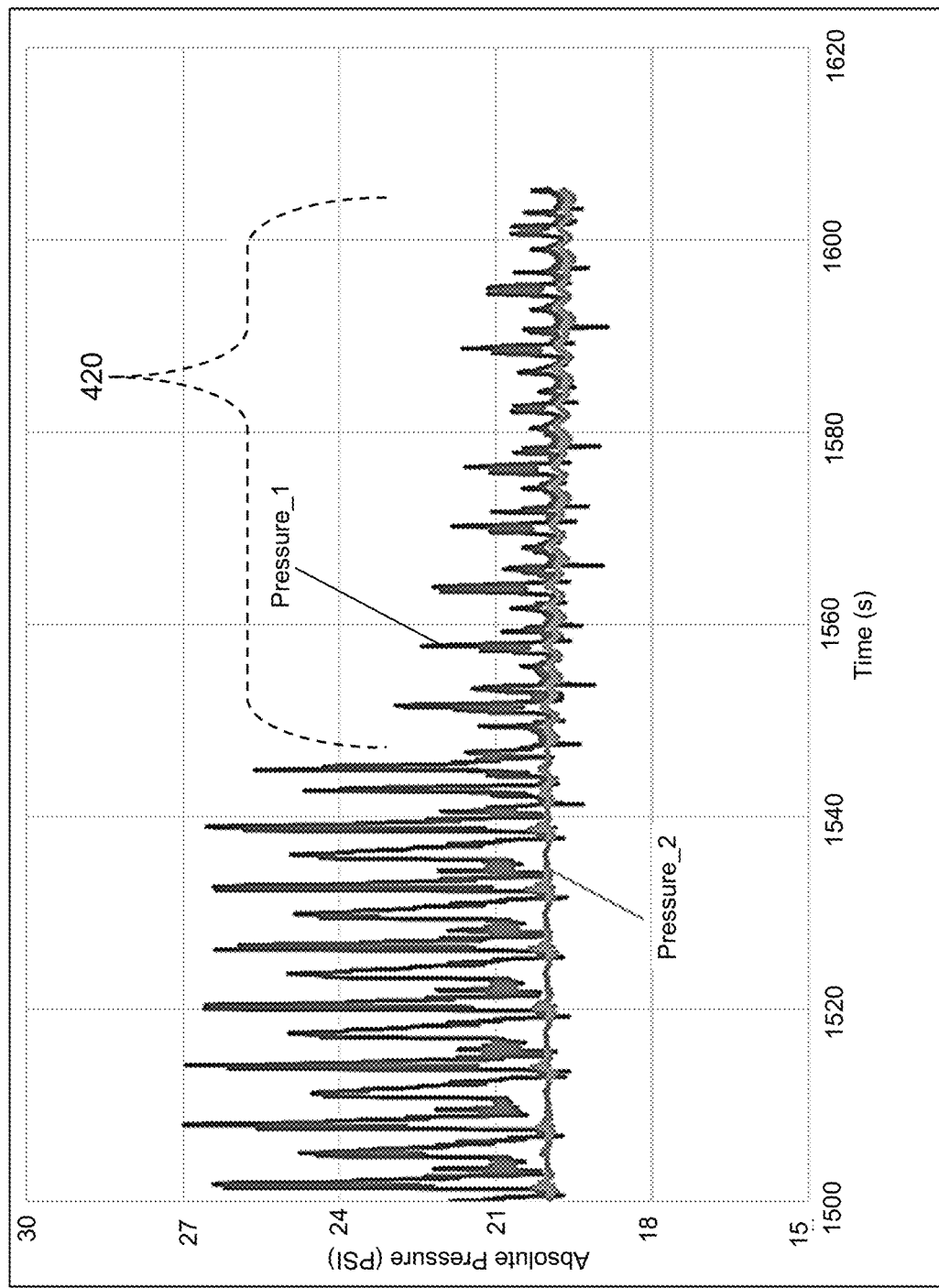

As illustrated in FIG. 21, the observed differential (or absolute) pressure initially increases (e.g., pressure buildup region 410) above a nominal level when the pumpjack starts and begins to pump fluid through the sensor. And when the accumulated fluid in the well has been pumped off (e.g., well pumped-off region 420), the pressure decreases back to near the nominal pressure level as shown in FIG. 22.

Figure 23:
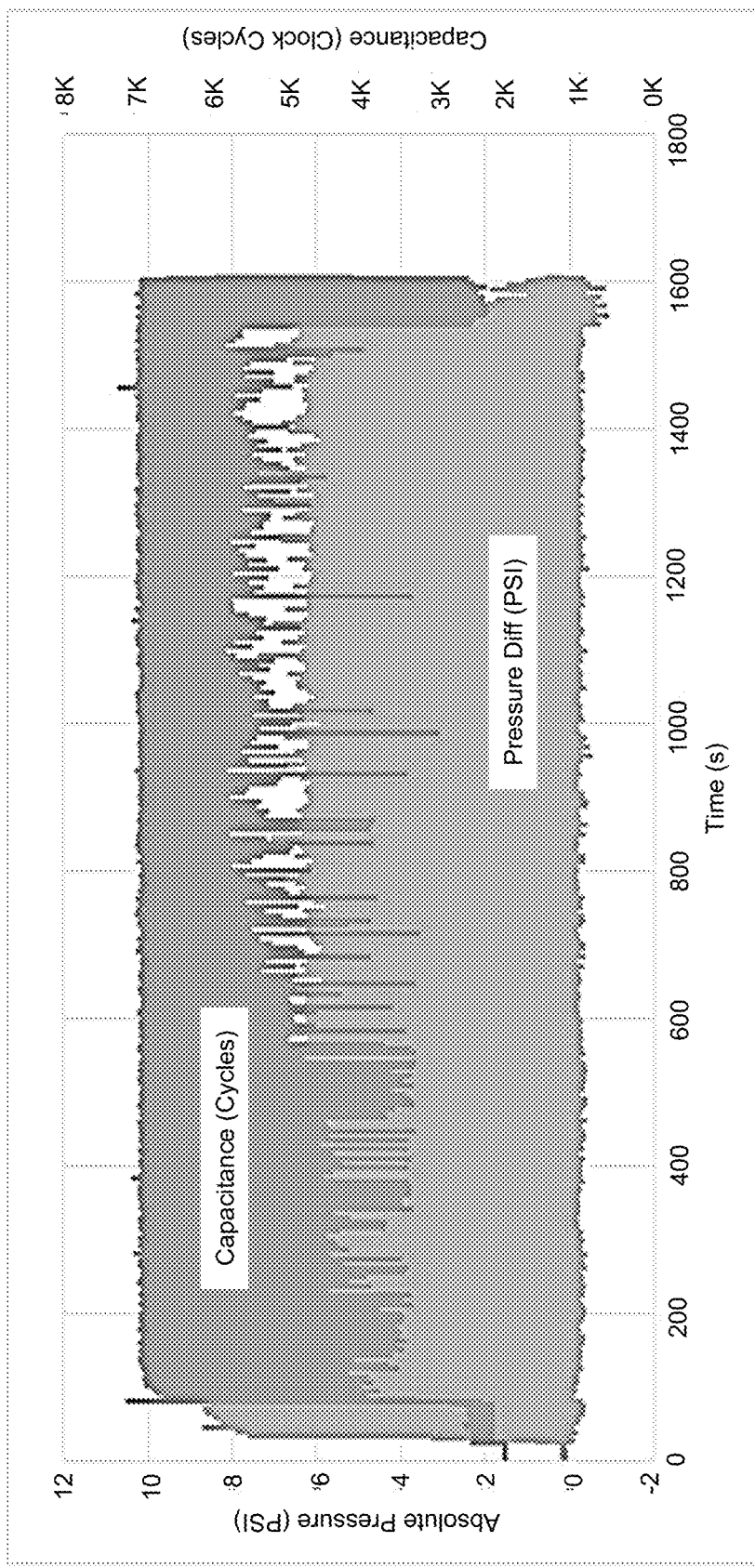
Figure 24:
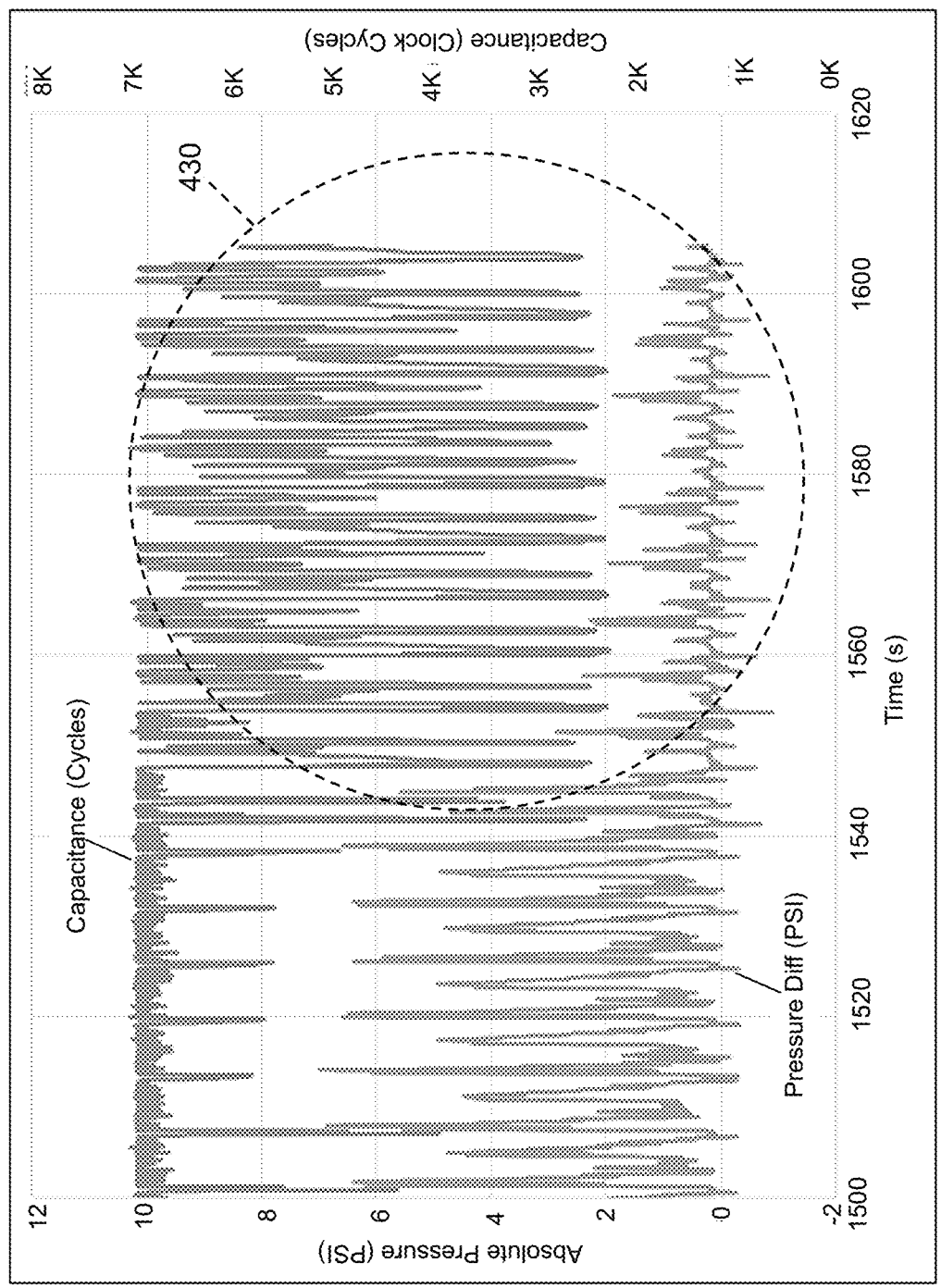

FIG. 23 is provided to illustrate how the controller records a time-series for the entire pumping cycle. Collection of the data allows for post processing to calculate the volume/water cut data, which can then be employed to facilitate greater accuracy of measurements. Any time fluid is pumped from a well it is expected that the fluid may be a combination of oil and water. Typically, "water cut" is the ratio or percentage of oil/water that was pumped. For example, for the well tested (see e.g., FIG. 23), upwards of 95-percent of the fluid being pumped may be water. Thus, the water cut would be characterized as 95-percent. The availability and analysis of data collected across entire pumping cycles facilitates the use of "learning", including comparison against prior data and pattern detection within the data, to facilitate adjustment of control parameters based upon past performance data for the pumpjack/well. And, as suggested above and in FIG. 24, the data from the sensor might also be used to allow the system to detect the presence of gas or foam within the fluid pumped from the well and passed through the sensor. For example, region 430 of the graph shows a combination of low pressure plus low/oscillating capacitance that may indicate the presence of foaming or gas.

Oil Recovery System

Figure 25:
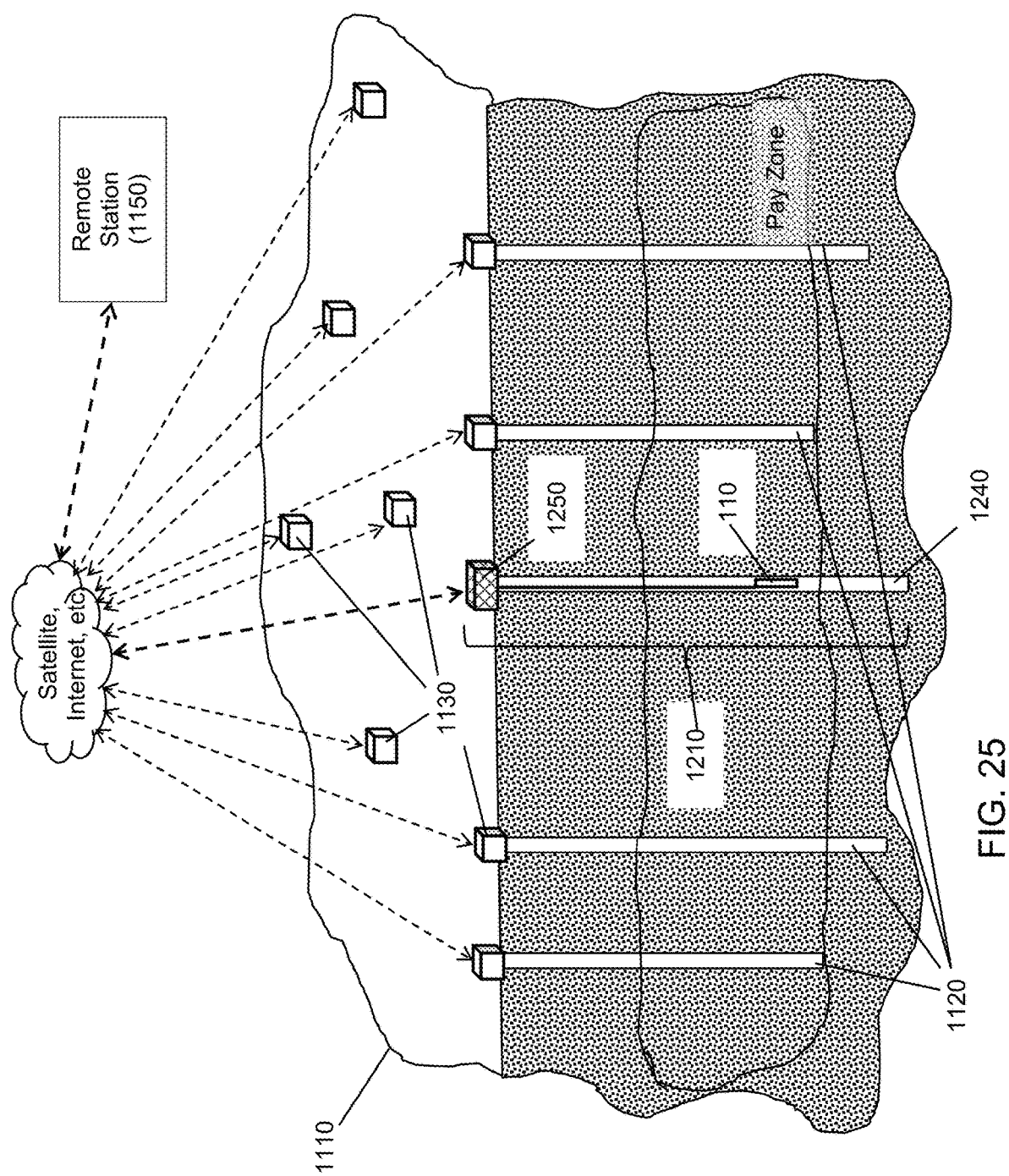
FIGS. 25-27 provide schematic illustrations of an exemplary oil recovery system and method employing venturi sensors and an oil recovery tool in accordance with an embodiment of the disclosed oil recovery system.
Figure 26:
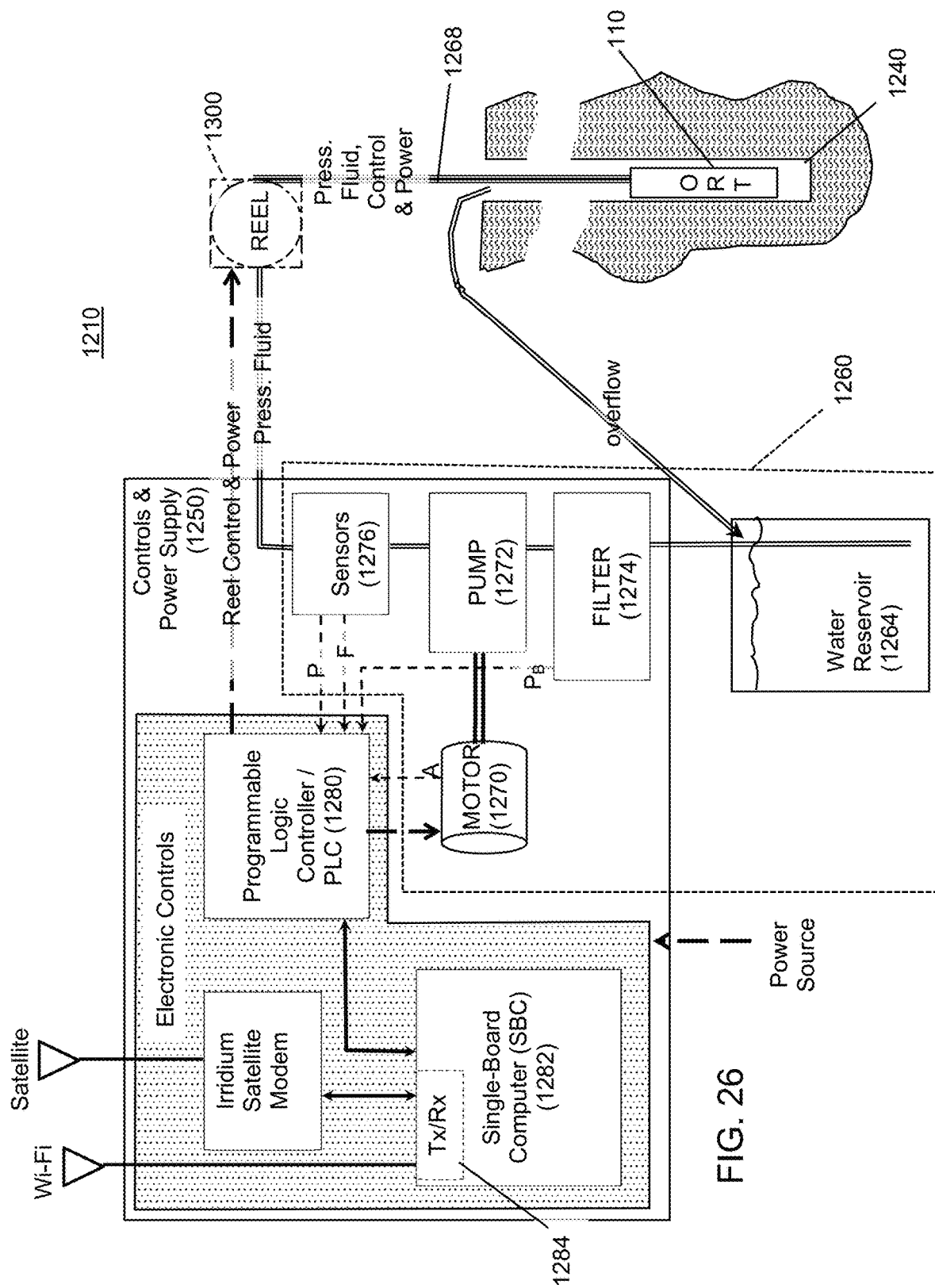
Figure 27:
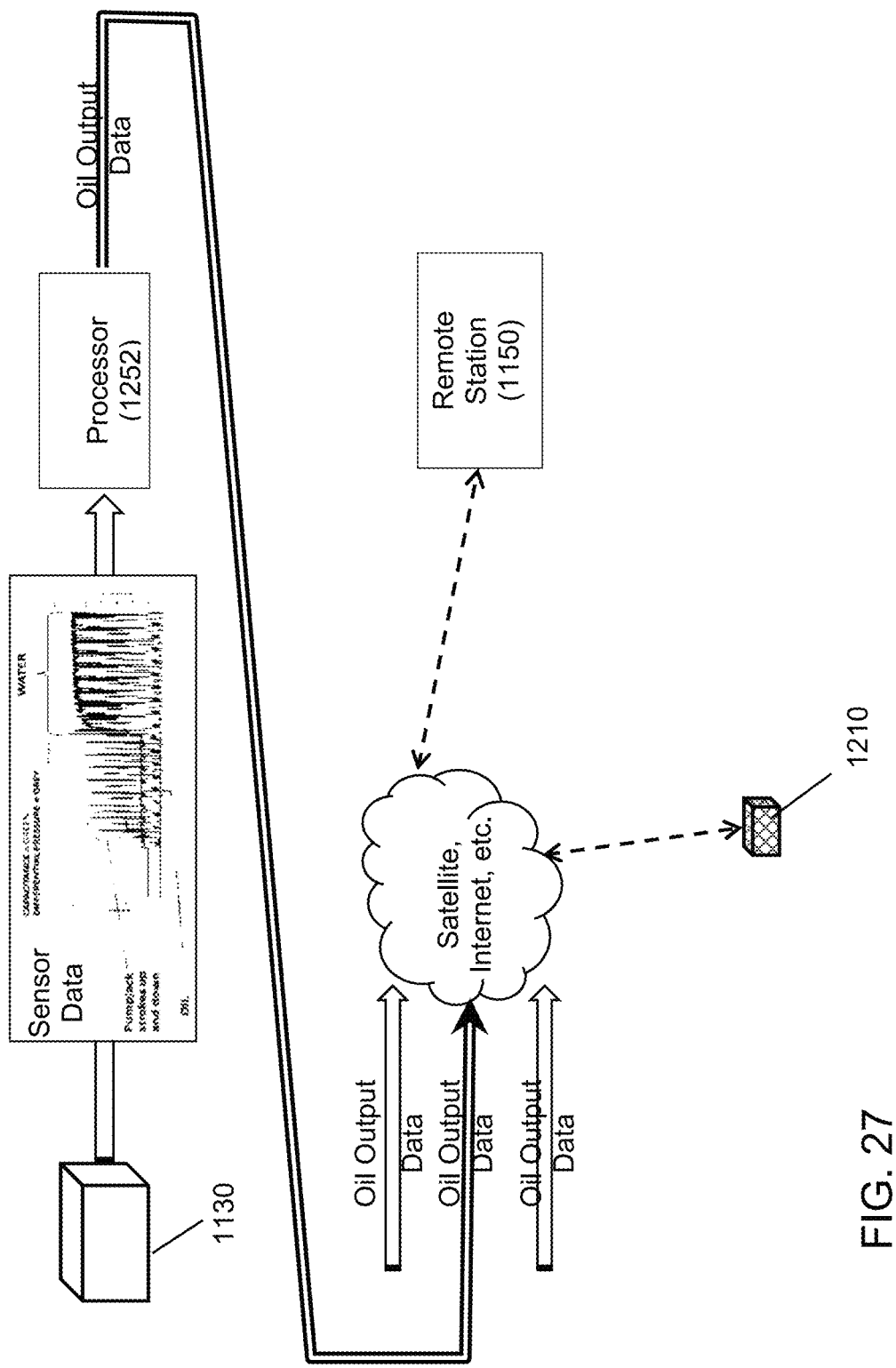

Having described both an oil-recovery tool and an output monitoring system suitable for use in an oil field 1110, attention is now turned to FIGS. 25-27. Depicted in FIG. 25 are a plurality of wells 1120, each having associated therewith a pump or other mechanism for extracting and collecting liquids (including oil) from the well. At least one of the wells also has a ground-level monitoring system 1130 such as depicted in FIGS. 14-19 operatively associated with the well, whereby the monitoring system is capable of generating data indicative of the amount of oil being produced from the well 1120. The ground-level monitoring system may also be capable of storing and/or transmitting data indicative of the oil volumes and related information to remote station 1150 via one or more communications channels (wired, wireless (e.g., satellite, microwave, WiFi, etc.)). The remote station 1150 includes both a computer system and data storage capability, wherein the computer system is capable of parsing and analyzing the collected data from one or more of the wells in field 1110 to assess performance of the field and particular wells over time and in response to various processes and treatments. One of such treatments may include the use of seismic or acoustic energy to stimulate the oil field in a manner suitable to increase the output of the wells and thereby improve the performance of the oil field in general.

Referring also to FIG. 26, depicted therein is an oil recovery system 1210, where an oil recovery tool 110 is employed within a borehole 1240 (e.g., at or below the fluid level), and is controlled by the system 1250 as depicted in FIG. 26. The oil recovery system 1210 for enhancing the recovery of oil within a reservoir, includes a source of pressurized fluid 1260, a submersible oil recovery tool 110 for imparting seismic wave energy within the oil reservoir 1110, in the form of a wave, so as to alter the capillary forces of residual oil therein, and a control system 1250 suitable for monitoring and controlling the system components including at least the oil recovery tool and the source of pressurized fluid to produce or generate seismic/acoustic wave energy within the reservoir. The oil recovery tool 110 includes a housing and a brushless motor, operatively located within the housing, as described in detail above, to receive the pressurized fluid and, in response to electrical power, generate the seismic/acoustic energy waves by release of pressurized fluid through aligned ports of the rotor and stator.

The source of pressurized fluid includes a replenishable fluid (e.g., a liquid such as water) reservoir 1264, a pressurization system for pressurizing the fluid from the reservoir and passing the pressurized fluid through a conduit 1268 to the oil recovery tool 110. In one embodiment the conduit 1268 is formed of multiple sections of tubing attached to the oil recovery tool 110 and assembled end-to-end as the tool is lowered into borehole 1240. In an alternative embodiment the conduit may include a flexible material suitable to be repeatedly lowered and raised in a borehole, possibly wound and unwound as needed from an optional reel 1300 (e.g., high-pressure hose or coiled tubing). The pressurization system includes a pump 1272 driven by motor 1270, in combination with a filter 1274, along with at least one sensor 1276 (e.g., fluid supply pressure (P) from pump, fluid flow rate (F) to oil recovery tool, pump motor current (A), fluid back pressure ($P_B$) at filter, etc.)) generating a signal and sending said signal to said control system.

It will be appreciated that in a simplified embodiment, generation of seismic waves via the oil recovery tool 110 involves an operator placing the tool in a borehole at a desired depth and providing, via the conduit 1268, a pressurized fluid (e.g., liquid) to operate the tool. In such an embodiment, any of a number of methods of controlling the rate and pressure of the fluid may be implemented on the surface. As illustrated in FIG. 26, one example of an embodiment of control system 1250 further includes a programmable logic controller 1280, a single-board computer 1282, and at least one external communication transceiver (Tx/Rx 1284) (e.g., WiFi, Bluetooth, Ethernet, satellite modem (Irridium)). The programmable logic controller uses a multi-core microcontroller and provides low-level controls by interfacing with and providing control signals and/or power (e.g., control/contactor for motors) to both the pump motor 1270 and the brushless motor in the oil recovery tool 110, and where the single-board computer is operatively connected to exchange commands and data with the programmable logic controller to effectuate various operations of the oil recovery system 1210 to consistently produce the seismic wave energy. In one embodiment the single-board computer 1282 employs a Linux-based operating system and stored programmatic instructions are employed for a plurality of functions. As will be appreciated, the oil recovery system, through the external communication transceiver, and in conjunction with the single-board computer, enables both autonomous and remote control of the oil recovery system. Such remote control may be effectuated via remote station 1150 as depicted in FIG. 25, whereby the operation, control and monitoring of system 1210 can be accomplished remotely, or at a centralized control console. Among other data, the oil recovery system permits the remote monitoring of operating parameters of the system (e.g., sensor data, control status, system faults, etc.) and facilitates the remote generation of commands to adjust certain parameters (e.g., the recovery tool motor speed (i.e., frequency). The ability to be able to adjust the operation of the oil recovery tool has the potential to avoid time and cost to conduct pre-studies of the oil field to pre-determine desirable operating characteristics. Indeed, the oil recovery tool can be deployed within a field and, with the previously-described monitoring equipment, the operations can be monitored and adjusted so as to optimize the performance and "tune" it for an oil field.

To provide for reliable performance, various components of the system may be optimized. For example conduit 1268, used to provide the pressurized fluid to oil recovery tool 110 is capable of handling a fluid pressure of up to at least 1500 psi, although normal operating pressures are typically in the range of about 250 to about 350 psig. In some deeper well uses, it is contemplated that the conduit 1268 and oil recovery tool need to be able to handle pressurized fluid (e.g., liquid) at pressures up to at least 7500 psi. Furthermore, in one embodiment, the conduit may be formed of a flexible (windable) material suitable for repeatedly being wound and unwound upon a reel to raise and lower the tool within the borehole, where the conduit further serves as an umbilical connection attached to and capable of lowering and raising the oil recovery tool relative to a borehole 1240 to adjust its depth. Alternatively, instead of being flexible, the conduit may be formed of a generally rigid material (e.g., steel tubing with piping assembled end-to-end), where the steel tubing with piping serve as a connection to, and capable of lowering and raising, the oil recovery tool relative to the borehole.

In summary, the system depicted in FIGS. 25-25 is capable of generating acoustic waves within a fluid medium to stimulate oil recovery within an oil reservoir. The system includes a source of pressurized fluid 1260, wherein the source includes a replenishable fluid (e.g., a liquid such as water) reservoir 1264 and a pressurization system (motor 1270, pump 1272, filter 1274, and sensors 1276) for pressurizing the fluid from the reservoir and passing the pressurized fluid through the conduit, the conduit 1268 terminating at an opposite end at the oil recovery tool 110. And, as described above, the oil recovery tool is generally retained with an elongated and generally cylindrical housing suitable for passing through a borehole. The tool itself includes an accumulator; an energy transfer section (may be inclusive of the pressure transfer valve), a motor, a valve such as a hollow-shaft rotor having an output port, and a stator having a corresponding output port whereby fluid energy is transferred upon alignment of the rotor and stator ports, and where the motor is operatively connected to the hollow-shaft rotor so that fluid passes therethrough to the accumulator. The motor, which may be frameless, is powered from the surface via the programmable logic controller via current-carrying wires associated with a conduit. As used herein the term "frameless" is intended to characterize a motor configuration that does not require a separate housing or frame to encompass the motor components, but where an associated structure (e.g., the outer housing of the oil recovery tool) serves the purpose of retaining the motor components in an operational relationship.

As described the oil recovery tool, and the motor therein, operate as a pressure transfer valve, wherein the pressurized fluid is stored within the accumulator and subsequently transferred through the ports into the surrounding fluid, thereby releasing seismic wave energy into the fluid surrounding the tool. The control system 1250 is suitable for monitoring and controlling at least the oil recovery tool and the source of pressurized fluid to produce the seismic waves within the reservoir. The oil recovery system 1210 produces a seismic wave at a frequency between about 10-100 Hz, and more preferably between 15-50 Hz.

As will be appreciated, the programmable logic controller 1280 and the single-board computer 1282 each include respective programmatic instructions for their operation, and the single-board computer includes programmatic instructions suitable for interfacing with and controlling certain operations of the programmable logic controller. As previously described relative to FIG. 27, the system may also include remote computer or computing station 1150, the remote computer including a storage medium suitable to storing programmatic instructions where the instructions facilitate a remote connection to the single-board computer 1282 via a communications channel selected from the group consisting of WiFi, Bluetooth®, Ethernet, and satellite modem. Using the remote computer, it is possible to both monitor the production of wells using a ground-level monitoring system 1130, as well as control and adjust the seismic output of the oil recovery tool 110, to optimize the output of oil field 1110.

The various components described relative to system 1210, depicted in FIGS. 25-27, need to reliably operate even though subject to power fluctuations and outages. To assure that the system 1210 is capable or returning to operation after a shutdown, one of the programmable logic controller and/or the single-board computer include non-volatile memory (NVM) suitable for storing data generated by the system. In one embodiment, the stored data includes an indication of whether the system is performing a restart after one of at least two events (e.g., a planned power-down or a blackout power-down).

With respect to FIG. 27, at the top of the figure a ground-level monitoring system 1130 is shown producing output from a sensor such as a venturi-type sensor, where the data may be processed (e.g., classified) by processor 1252 so as to characterize an amount or rate of oil produced from the associated well. The oil production data is then passed or further processed (e.g., remote station 1150) where the oil production data is compared and contrasted, and an algorithm or other artificial intelligence operations may be employed to determine whether adjustments should be made on the operating parameters of oil recovery system 1210, whereby the remote station may relay new parameter settings (e.g., frequency, pressure, depth) back to the recovery system to optimize performance of the oilfield. It will be further appreciated that the remote station may process input from a plurality of well monitoring systems, and that the oil production data from such monitoring systems may be concurrently used to optimize production of a series of wells in a field, even though one or more wells may not themselves be optimized. In summary, a classifier (e.g., processor 1252) analyzes the raw data output from the venturi sensors in monitoring system 1130 to automatically detect the oil/water transition and totalize the oil production from the sensor data. The oil production data is then fed to the remote station where an advanced algorithm and/or artificial intelligence system gathers the production data and adjusts the output of the oil recovery system and tool automatically to optimize oil field performance autonomously.

As another alternative, some or all of the components depicted in FIG. 25, including the optional motorized reel 1300 for raising and lowering the flexible conduit, may be trailer-mounted to make the system 1210 more portable. And, in implementing a trailerable embodiment, it may also be possible to include alternative, uniform and/or backup power systems so that down-time due to interruptions in power to the system location can be reduced or eliminated.

Figure 28:
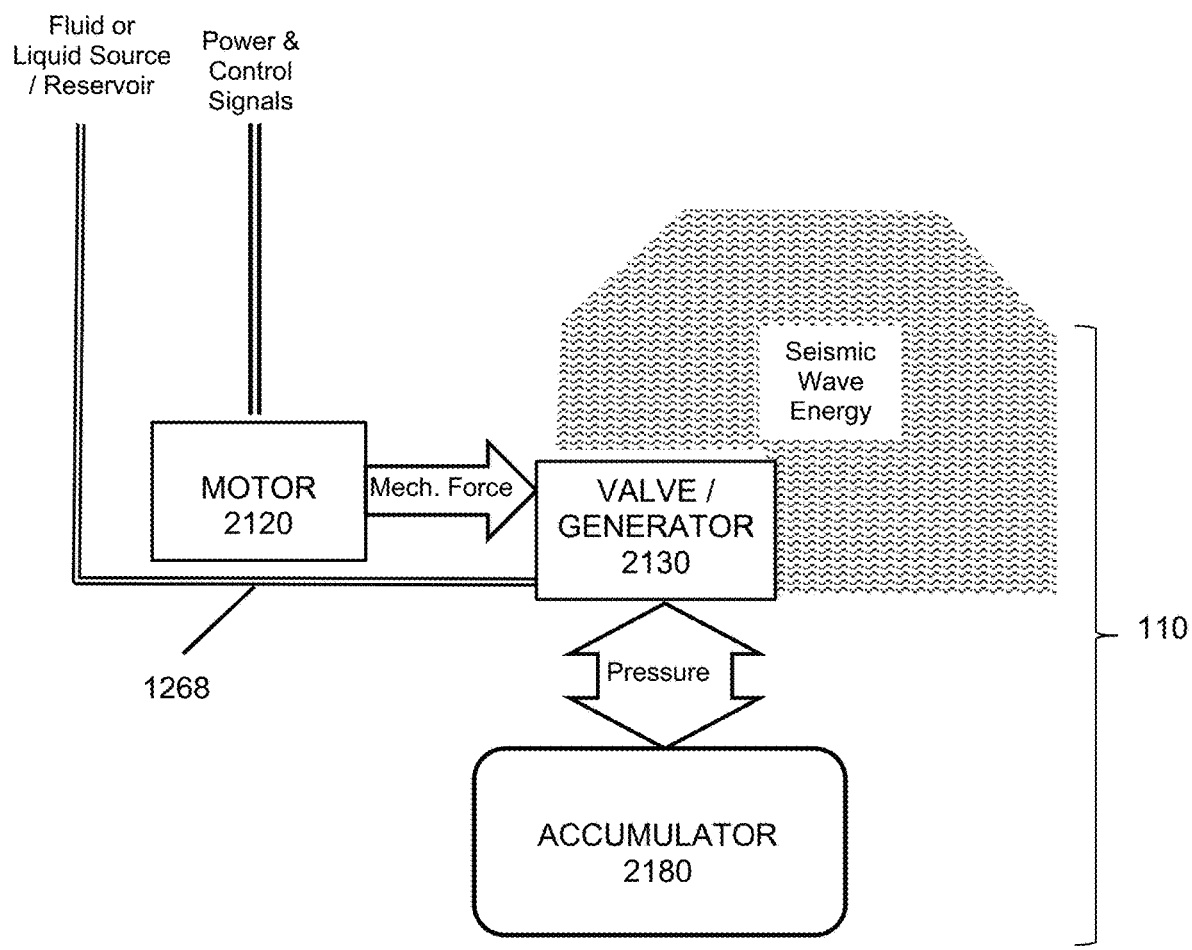
FIG. 28 is a schematic illustration of a submersible oil recovery tool, and the components thereof.

Referring to FIG. 28, depicted therein is a schematic illustration of an oil recovery tool 110. As has been described above in various embodiments, and as generally represented by the components in the figure, the oil recovery tool comprises three principal components: a valve 2130, a motor 2120, and an accumulator 2180. The submersible oil recovery tool 110 is employed to impart seismic wave energy within an oil reservoir to alter the capillary forces of the residual oil and mobilize it to improve oil recovery from the reservoir, for example as illustrated in FIGS. 25-26.

As a functional summary of the various embodiments disclosed herein, one purpose of the valve 2130 is to generate the seismic waves that are propagated through the reservoir. A purpose of the motor 2120, which is mechanically coupled to the valve and provides a mechanical force to move or actuate the valve, is to open and close the valve in response to signals received by the motor. In one embodiment, it is contemplated that the motor, in response to such signals, operates the valve in a periodic manner. For example, the valve may be operated by the motor to generate waves within a frequency range of about 10 Hz to about 100 Hz, and more particularly a frequency range of about 15 Hz to about 50 Hz. It will be appreciated, as described above, that the frequency and other characteristics of the seismic waves is, at least to some extent, subject to customization and optimization for the conditions in which the oil recovery tool 110 is deployed. The nature of the valve 2130 is not specifically defined in the schematic and is intended to incorporate linear, rotary (rotor and stator) or other types of valves. The similarity of the valves is that two components, each having a port or aperture therein are moved relative to one another so that the ports controllably, and possibly with regular periodicity or frequency, align with one another to allow pressurized fluid to escape and generate the seismic wave.

The purpose of the accumulator 2180 is to refine and intensify the seismic pulse generated by the oil recovery tool. When the valve 2130 is closed, pressure briefly increases and fluid flows into the accumulator, compressing a compliant chamber (e.g., formed with a spring-loaded piston or a pre-pressurized (nitrogen-filled) bladder). When the valve 2130 opens, pressure is released, forcing the fluid out of the accumulator. The necessary fluid flow includes a combination of pressure and volume/time (flow rate) of the fluid. And, the necessary fluid flow is to at least some extent dependent upon the type of fluid employed as well as the desired seismic wave characteristics.

In one embodiment, motor 2120 may include a speed ratio mechanism (e.g., gear train, transmission, etc.) capable of increasing or reducing the output rpm from the motor to the input rpm to the rotary valve to optimize the operation of the valve to maximize the potential of the tool to improve recovery. The motor 2120 may be either electrically or hydraulically powered. Either means of powering the motor may be employed depending on the operating conditions present where the tool is deployed. Electric motors have the advantage of being able to vary the valve's pulse rate independent of injection rate while the tool is deployed. Hydraulic motors, which may include a progressive cavity pump, have the advantage of not requiring an electric power cable attached to the tool and run back to the surface.

It should be understood that various changes and modifications to the embodiments described herein will be apparent to those skilled in the art. Such changes and modifications can be made without departing from the spirit and scope of the present disclosure and without diminishing its intended advantages. It is therefore anticipated that all such changes and modifications be covered by the instant application.

What is claimed is:

1. An oil recovery system for enhancing the recovery of oil within a reservoir, including:
  a source of pressurized fluid;

a submersible oil recovery tool for imparting seismic wave energy within the oil reservoir, in the form of a wave, to alter the capillary forces of residual oil therein, comprising,
a housing; and
a frameless, fluid-saturated motor, operatively located within said housing to drive a rotary valve including a rotor having at least one port rotating relative to at least one port in the housing,
an accumulator, fluidly connected to the rotor to receive the pressurized fluid and generate the seismic waves by release of the pressurized fluid upon alignment of the at least one rotor port with the at least one port in the housing, said motor permitting the flow of the pressurized fluid from the source of pressurized fluid, through the motor to the rotor and the fluidly connected accumulator; and
a control system suitable for monitoring and controlling the system components including at least the oil recovery tool and the source of pressurized fluid to produce the seismic waves within the reservoir.

2. The oil recovery system according to claim 1, wherein said source of pressurized fluid includes:
a source of replenishable liquid;
a pressurization system for pressurizing the liquid from said source of replenishable liquid and passing the pressurized liquid through a conduit to the oil recovery tool.

3. The oil recovery system according to claim 2, wherein said pressurization system includes a pump in combination with a filter, along with at least one sensor generating a signal and sending said signal to said control system.

4. The oil recovery system according to claim 2, wherein said conduit is capable of handling a fluid pressure of up to at least 7500 psi.

5. The oil recovery system according to claim 1 wherein said submersible oil recovery tool further comprises,
an accumulator, and
an acoustic wave generator operatively connected to said fluid-saturated motor.

6. The oil recovery system according to claim 5, wherein said acoustic wave generator includes a rotary valve with a rotor and stator, each having ports therein, said rotor being operatively connected to said fluid-saturated motor.

7. The oil recovery system according to claim 6 wherein said accumulator is positioned below the rotary valve when the submersible oil recovery tool is in the reservoir.

8. The oil recovery system according to claim 6 wherein said accumulator is positioned above the rotary valve when the submersible oil recovery tool is in the reservoir.

9. The oil recovery system according to claim 6 wherein the accumulator is positioned above the rotary valve and the motor is positioned below the rotary valve when the submersible oil recovery tool is in the reservoir.

10. The oil recovery system according to claim 5, wherein said accumulator includes a compliant chamber.

11. The oil recovery system according to claim 1, wherein said rotary valve further includes at least one hydraulic bearing employing the pressurized fluid to reduce friction.

12. The oil recovery system according to claim 11, wherein said rotor includes a plurality of small ports permitting the flow of the pressurized fluid to the at least one hydraulic bearing.

13. An oil recovery tool for imparting seismic wave energy within an oil reservoir, in the form of a wave, so as to alter the capillary forces of residual oil comprising:

a source of pressurized fluid; and
a housing including an accumulator in fluid connection with a frameless, water-saturated motor within the housing to drive a rotating valve having a rotor with at least one port rotating relative to at least one port in the housing, an accumulator, fluidly connected to the rotor to receive the pressurized fluid and rotate the rotor to generate the seismic waves by release of the pressurized fluid in the accumulator upon alignment of the at least one port of the rotor with at least one port in the housing.

14. An oil recovery system for enhancing the recovery of oil within a reservoir, including:
a source of pressurized liquid;
a submersible oil recovery tool for imparting seismic wave energy within the oil reservoir, in the form of a wave, to alter the capillary forces of residual oil therein, comprising,
a housing; and
an acoustic wave generator, operatively located within said housing to receive the pressurized liquid and generate the seismic waves through controlled release of the pressurized liquid; and
a control system suitable for monitoring and controlling the system components including at least the oil recovery tool and the source of pressurized liquid to produce seismic waves within the reservoir, wherein said control system includes:
a programmable logic controller;
a single-board computer; and
at least one external communication transceiver,
wherein the programmable logic controller provides low-level controls by interfacing with and providing control signals and power to the acoustic wave generator in the oil recovery tool, and where the single-board computer is operatively connected to exchange commands and data with the programmable logic controller to effectuate various operations of the oil recovery system to consistently produce the seismic waves.

15. The oil recovery system according to claim 14, wherein said acoustic wave generator further includes a frameless, water-saturated motor, operatively located within said housing and connected to a rotor operatively associated with a stator to receive the pressurized fluid and generate the seismic waves by release of the pressurized fluid.

16. The oil recovery system according to claim 15, wherein said motor permits the flow of the pressurized fluid therethrough.

17. The oil recovery system according to claim 15 wherein said submersible oil recovery tool further comprises,
an accumulator, and
an acoustic wave generator operatively connected to said water-saturated motor.

18. The oil recovery system according to claim 17, wherein said acoustic wave generator includes a rotary valve with a rotor and stator, each having ports therein, said rotor being operatively connected to said fluid-saturated motor.

19. The oil recovery system according to claim 18 wherein said accumulator is positioned below the rotary valve when the submersible oil recovery tool is in the reservoir.

20. The oil recovery system according to claim 17, wherein said accumulator includes a compliant chamber.

* * * * *